(12) United States Patent
Budike, Jr.

(10) Patent No.: US 7,346,433 B2
(45) Date of Patent: *Mar. 18, 2008

(54) WIRELESS INTERNET POWER CONTROL SYSTEM

(75) Inventor: Lothar E. S. Budike, Jr., Villanova, PA (US)

(73) Assignee: Powerweb, Inc., Media, PA (US)

( * ) Notice: Subject to any disclaimer, the term of this patent is extended or adjusted under 35 U.S.C. 154(b) by 210 days.

This patent is subject to a terminal disclaimer.

(21) Appl. No.: 11/165,044

(22) Filed: Jun. 24, 2005

(65) Prior Publication Data

US 2006/0025891 A1 Feb. 2, 2006

Related U.S. Application Data

(63) Continuation-in-part of application No. 10/700,058, filed on Nov. 4, 2003, now Pat. No. 7,167,777.

(51) Int. Cl.
*G05D 25/00* (2006.01)

(52) U.S. Cl. ................................. 700/277; 700/295

(58) Field of Classification Search ........... 700/277, 700/284, 297, 295; 709/201; 219/462.02, 219/462.46, 713; 246/38, 44; 340/5.63; 370/913; 463/39; 315/307

See application file for complete search history.

(56) References Cited

U.S. PATENT DOCUMENTS

| | | | |
|---|---|---|---|
| 5,381,078 A * | 1/1995 | Szuba | 315/316 |
| 5,471,119 A | 11/1995 | Ranganath et al. | |
| 5,909,429 A | 6/1999 | Satyanarayana et al. | |
| 6,181,086 B1 | 1/2001 | Katyl et al. | |
| 6,507,158 B1 | 1/2003 | Wang | |
| 6,608,453 B2 | 8/2003 | Morgan et al. | |
| 6,681,154 B2 | 1/2004 | Nierlich et al. | |
| 6,771,029 B2 * | 8/2004 | Ribarich et al. | 315/292 |
| 6,792,323 B2 | 9/2004 | Krzyzanowski et al. | |
| 6,836,080 B2 | 12/2004 | Kazanov et al. | |
| 6,861,956 B2 * | 3/2005 | Ying | 340/825.69 |
| 6,885,309 B1 | 4/2005 | Van Heteren | |
| 6,892,168 B2 | 5/2005 | Williams et al. | |
| 6,990,394 B2 * | 1/2006 | Pasternak | 700/295 |
| 2002/0052940 A1 * | 5/2002 | Myers et al. | 709/223 |
| 2003/0063723 A1 * | 4/2003 | Booth et al. | 379/106.03 |
| 2004/0078153 A1 * | 4/2004 | Bartone et al. | 702/57 |
| 2005/0023996 A1 | 2/2005 | Adamson et al. | |
| 2005/0184671 A1 | 8/2005 | Williams et al. | |
| 2006/0159043 A1 * | 7/2006 | Delp et al. | 370/328 |

* cited by examiner

*Primary Examiner*—Leo Picard
*Assistant Examiner*—Sheela Rao
(74) *Attorney, Agent, or Firm*—McKenna Long & Aldridge LLP

(57) ABSTRACT

An energy control system for managing utility operation parameters, including a plurality of utility devices, at least one control module connected to at least one of the utility devices; a data processing module connected to the at least one control module via a wireless communications link; and a wireless internet control center connected to the at least one control module via the data processing module and arranged to operate a plurality of utility operation applications. The control system may further include a plurality of repeaters connected to the data processing module.

19 Claims, 28 Drawing Sheets

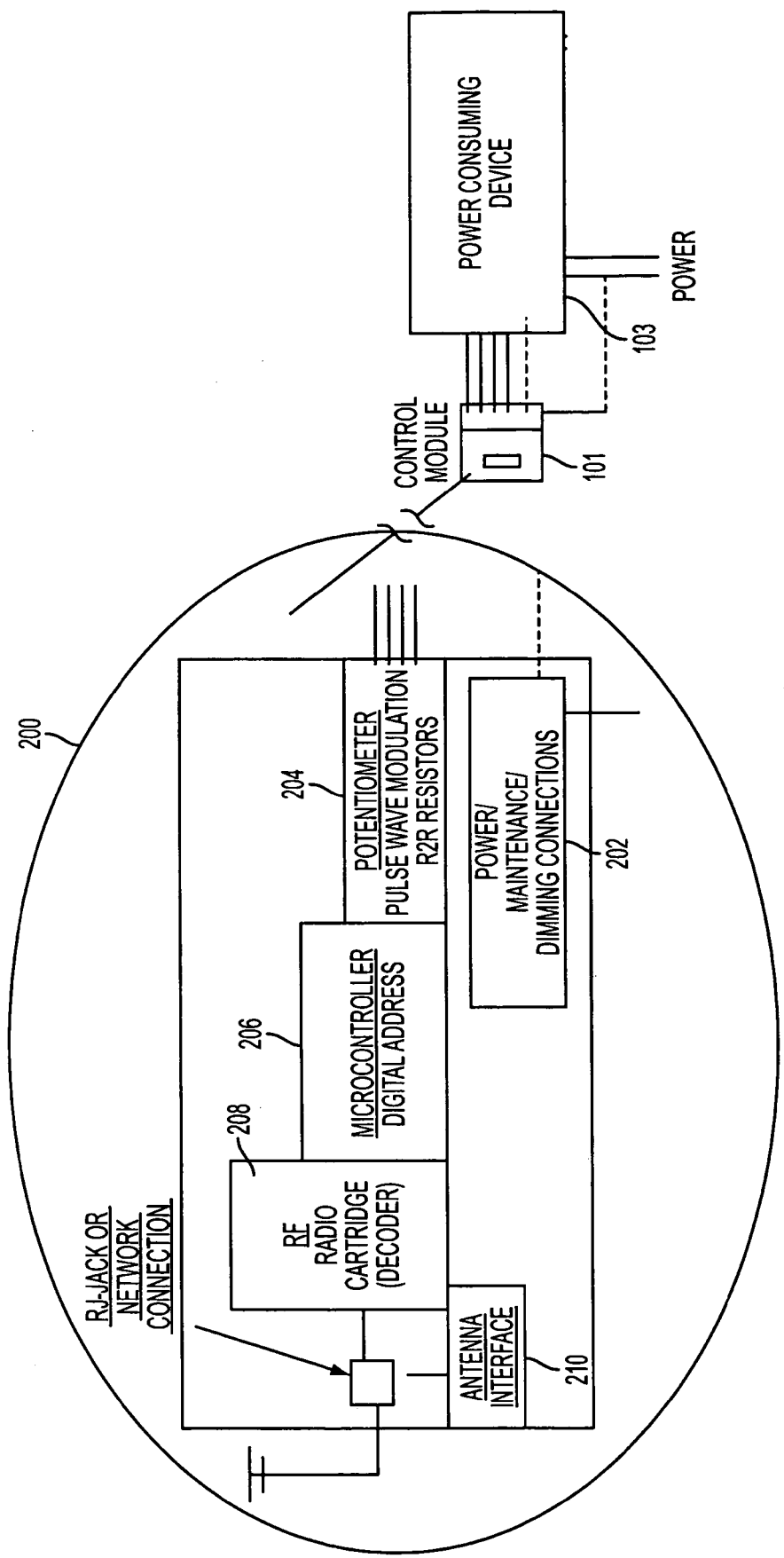

| Weekday | Weekend |
|---|---|
| Set Time<br>[ Sunrise ▼ ]<br>Set Level<br>[ Full Bright ▼ ] | Set Time<br>[ 08:00AM ▼ ]<br>Set Level<br>[ Full Bright ▼ ] |
| Set Time<br>[ 08:00 AM ▼ ]<br>Set Level<br>[ 75% Bright ▼ ] | Set Time<br>[ 12:00 PM ▼ ]<br>Set Level<br>[ 75% Bright ▼ ] |
| Set Time<br>[ 05:00 PM ▼ ]<br>Set Level<br>[ 50% Bright ▼ ] | Set Time<br>[ 05:30 PM ▼ ]<br>Set Level<br>[ 50% Bright ▼ ] |
| Set Time<br>[ 10:00 PM ▼ ]<br>Set Level<br>[ 25% Bright ▼ ] | Set Time<br>[ 11:00 PM ▼ ]<br>Set Level<br>[ 25% Bright ▼ ] |

FIG. 6C

Customer Information

CUSTOMER NAME: *
ACCOUNT NUMBER: *
ADDRESS:
CITY:
STATE:
ZIP CODE:
PHONE:
CELL PHONE:
FAX:
PAGER:
TIME ZONE: *   Eastern Time (w/ Daylight Saving)
DECISION MAKER SALUTATION:
DECISION MAKER FIRST NAME:
DECISION MAKER LAST NAME:

FIG. 11

Building Information

| Field | Value |
|---|---|
| BUILDING NAME*: | Way Cool Power Inc. |
| BUILDING ACCOUNT#*: | 876567 |
| ADDRESS*: | Somehwere |
| CITY:* | Herethere |
| STATE:* | WA |
| ZIP CODE:* | 90210 |
| PHONE: | |
| CELL PHONE: | |
| FAX: | |
| PAGER: | |
| TIME ZONE: | Eastern Time (w/ Daylight Saving) |
| BELONGS TO CUSTOMER: | - Way Cool Power Inc. - |
| APPROX. SQ. FT. OF BUILDING: | |
| NUMBER OF FLOORS: | |
| APPROX. SQ. FT. PER FLOOR: | |
| APPROX. NO. OF FIXTURES PER FLOOR: | |
| CUSTOMER ASSOC. W/BUILDING ACCT. NO.: | |

FIG. 12

USER EDITOR: HALOGEN DEMO SITE

System Administrator to Torben Wilson (1-9 of 9) ▼ [Go]     [Add new user]

| USER | CONTACT INFORMATION | MAILING ADDRESS | USERNAME | USER TYPE | ACTION |
|---|---|---|---|---|---|
| System Administrator | NOREPLY@power-way.com | | admin | System Administrator | edit delete |
| Lou Budlike | lbudlike@2powerweb.com<br>Ph: (555) 555-1212 | N/A Media PA | lou | System Administrator | edit delete |
| John Grillo | jgrillo@nescorp.com<br>Ph: (609) 383-2489 | 30 East Woodland Ave Northfield NJ | john | Distributor | edit delete |
| Distro Test 1 None | temp@thebuttlesschaps.com<br>Ph: (555) 555-1212 | N/A N/A PA | test | Distributor | edit delete |
| John T O'neill | jto@Comcast.com<br>Ph: (609) 369-3698 | 123 First Str. Bay Village OH | JTO | Building Manager | edit delete |
| Edmond Ragazzi | eragazzi@nescorporation.com<br>Ph: (609) 383-2940<br>Cell: (609) 432-4329<br>Fax: (609) 383-2736 | Suite 2C - 3153 Fire Road Egg Harbour Township NJ | edmond | Distributor | edit delete |
| Joe User | juser@waycoolco.com<br>Ph: (555) 555-6543 | 456 Main Street Anytown PA | juser | User | edit delete |
| Joe Villa | jvilla@2powerweb.com<br>Ph: (727) 534-4996 | 3327 West Burke St Tampa FL | jvilla | System Administrator | edit delete |
| Torben Wilson | torben@thebuttlesschaps.com<br>Ph: (555) 555-1254 | 123 Example Lane Exampleton WA | torben | System Administrator | edit delete |

FIG. 13

METER EDITOR: WAY COOL POWER INC.

Joe's test two to Hudson View 1 (1-9 of 9) ▾ [Go]    [Add new meter]

| COMMON NAME | BUILDING | IP ADDRESS | MULTIPLIER | DEVICE TYPE | DEVICE STATUS | ACTION |
|---|---|---|---|---|---|---|
| Joe's test two | Campus Headquarters | pw020.kicks-ass.net | 1 | COM1000 rev 100 | OK | edit I delete |
| Joe's test one | Campus Headquarters | pw020.kicks-ass.net | 1 | COM1000 rev 100 | OK | edit I delete |
| SCT test meter channel 4 | Campus Headquarters | pwsctsupport.kicks-ass.net | 1 | COM1000 rev 99 | OK | edit I delete |
| SCT test meter channel 2 | Campus Headquarters | pwsctsupport.kicks-ass.net | 1 | COM1000 rev 99 | OK | edit I delete |
| SCT test meter channel 1 | Campus Headquarters | pwsctsupport.kicks-ass.net | 1 | COM1000 rev 99 | OK | edit I delete |
| SCT test meter channel 3 | Physics lab | pwsctsupport.kicks-ass.net | 1 | COM1000 rev 99 | OK | edit I delete |
| Main Dist | NESC Egg Harbor Township Office | pw012.power-wav.com | 0.0072 | COM1000 rev ? | OK | edit I delete |
| Bay Village NH | Bradley Bay | 456321 | 0.0071 | COM1000 rev ? | OK | edit I delete |
| Hudson View 1 | Hudson View | pw023.power-wav.com | 0.72 | COM1000 rev ? | OK | edit I delete |

CLOSE

Done

FIG. 14

ROUTER EDITOR: WAY COOL POWER INC.

Bradley Bay Router to Wireless router 4 (CDMA 418 MHz) (1-8 of 8) ▽ [Go]   [Add new router]    CLOSE

| NAME | BUILDING | STATUS | IP ADDRESS | PORT | ACTION |
|---|---|---|---|---|---|
| Bradley Bay Router | Bradley Bay | OK | 1123456 | 12345 | edit I delete |
| Halogen WLR 1 | Philadelphia University | Connection timed out | 166.139.16.195 | 12345 | edit I delete |
| HV Water heater | Hudson View | OK | 4843261528.eairlink.com | 12345 | edit I delete |
| NESC WLR 1 (CDMA 418MHz) test | NESC Egg Harbor Township Office | OK | 166.139.16.194 | 12345 | edit I delete |
| Wireless router 1 test | Campus Headquarters | Connection timed out | 166.139.16.1 | 12345 | edit I delete |
| Wireless router 2 (418 MHz) | Physics lab | Connection timed out | 166.157.156.226 | 12345 | edit I delete |
| Wireless router 3 (CDMA 433.9) | Physics lab | Connection timed out | 166.139.204.121 | 12345 | edit I delete |
| Wireless router 4 (CDMA 418 MHz) | Physics lab | Address family not supported by protocol | none | 12345 | edit I delete |

FIG. 15

ZONE EDITOR: WAY COOL POWER INC.

Hallways to Heater element 3 (1-19 of 19) ▸ [Go]     [Add new lighting zone]     CLOSE

| NAME | ROUTER | DIP SWITCH | STATUS | LEVEL | LOAD@100% | ACTION |
|---|---|---|---|---|---|---|
| Hallways | Wireless router 1 test | 0202 | OK | 0% | 0 kW | edit \| delete |
| Reception | Wireless router 1 test | 0303 | OK | 0% | 0 kW | edit \| delete |
| Coffee Room | Wireless router 1 test | 0404 | OK | 0% | 0 kW | edit \| delete |
| Basement | Wireless router 2 (418 MHz) | 0505 | OK | 0% | 12 kW | edit \| delete |
| Lab | Wireless router 2 (418 MHz) | 0202 | OK | 0% | 0 kW | edit \| delete |
| Cubicles 1 | Wireless router 4 (CDMA 418 MHz) | 0202 | OK | 0% | 0 kW | edit \| delete |
| Conference Room | NESC WLR 1 (CDMA 418 MHz) test | 0707 | Not responding | 0% | 0.065 kW | edit \| delete |
| Computer Room | NESC WLR 1 (CDMA 418 MHz) test | 0606 | Not responding | 0% | 0.075 kW | edit \| delete |
| Air Conditioner | NESC WLR 1 (CDMA 418 MHz) test | 0505 | Not responding | 0% | 0.07 kW | edit \| delete |
| PJ & Dudly | NESC WLR 1 (CDMA 418 MHz) test | 0404 | Not responding | 0% | 0.08 kW | edit \| delete |
| Ed's Office | NESC WLR 1 (CDMA 418 MHz) test | 0303 | Not responding | 0% | 0.08 kW | edit \| delete |
| Rusty's Office | NESC WLR 1 (CDMA 418 MHz) test | 0202 | Not responding | 0% | 0.09 kW | edit \| delete |
| Receptacle | Halogen WLR 1 | 0404 | OK | 0% | 0 kW | edit \| delete |
| Fluorescent | Halogen WLR 1 | 0303 | OK | 0% | 0 kW | edit \| delete |
| Halogen Test Zone 1 | Halogen WLR 1 | 0202 | OK | 0% | 0 kW | edit \| delete |
| Johns Office | Bradley Bay Router | 0202 | Has lamps out | 0% | 0.5 kW | edit \| delete |
| Heater element 1 | HV Water heater | 0202 | Has lamps out | 0% | 0 kW | edit \| delete |
| Heater element 2 | HV Water heater | 0303 | Has lamps out | 0% | 0 kW | edit \| delete |
| Heater element 3 | HV Water heater | 0404 | Has lamps out | 0% | 0 kW | edit \| delete |

FIG. 16

| HV WATER HEATER | | | ROUTER STATUS: CONNECTION REFUSED | | | |
|---|---|---|---|---|---|---|
| CURRENTLY RUNNING SCENE: NO ACTIVE SCENE | | | ESTIMATED CURRENT DEMAND: 0 kW / 15 kW | | | |
| ZONE | STATUS | LEVEL | LOCKED UNTIL | NEW LEVEL | DURATION | PRIORITY |
| Heater element 1 | OK | -1% | Not locked | Unspecified ▷ | Unspecified ▷ | 1 ▷ |
| Heater element 2 | OK | -1% | Not locked | Unspecified ▷ | Unspecified | 1 ▷ |
| Heater element 3 | OK | -1% | Not locked | Unspecified ▷ | 15 mins | 1 ▷ |
| | | | | | 30 mins | |
| | | | | | 45 mins | Set levels |
| | | | | | 1 hr. 0 min. | |
| | | | | | 1 hr. 15 min. | |
| | | | | | 1 hr. 30 min. | |
| | | | | | 1 hr. 45 min. | |
| | | | | | 2 hr. 0 min. | |

FIG. 17A

| Address (HEX) | SW1 | SW2 | SW3 | SW4 | SW5 | SW6 | SW7 | SW8 |
|---|---|---|---|---|---|---|---|---|
| 00 | Up | Up | Up | Up | Up | Up | Up | Up |
| 01 | Up | Up | Up | Up | Up | Up | Up | Down |
| 02 | Up | Up | Up | Up | Up | Up | Down | Up |
| 03 | Up | Up | Up | Up | Up | Up | Down | Down |
| 04 | Up | Up | Up | Up | Up | Down | Up | Up |
| 05 | Up | Up | Up | Up | Up | Down | Up | Down |
| 06 | Up | Up | Up | Up | Down | Down | Down | Down |
| 07 | Up | Up | Up | Up | Down | Up | Down | Up |
| 08 | Up | Up | Up | Up | Up | Up | Up | Up |
| 09 | Up | Up | Up | Up | Up | Up | Up | Down |

FIG. 17B

SUMMER MONTHS:

| J | F | M | A | M | J | J | A | S | O | N | D |
|---|---|---|---|---|---|---|---|---|---|---|---|
| ☐ | ☐ | ☐ | ☐ | ☐ | ☐ | ☑ | ☑ | ☑ | ☐ | ☐ | ☐ |

ON-PEAK HOURS: From 08:00 ▸ until 20:00 ▸

Save Building

DEMAND PEAK EDITOR: NESC EGG HARBOR TOWNSHIP OFFICE     CLOSE

METER: Main Dist ▸

YEAR: 2005

| NAME | JAN | FEB | MAR | APR | MAY | JUN | JUL | AUG | SEP | OCT | NOV | DEC |
|---|---|---|---|---|---|---|---|---|---|---|---|---|
| Annual Peak kW | 8 | 8 | 8 | 11 | 11 | 11 | 11 | 11 | 11 | 8 | 8 | 8 |
| Last Year's Monthly Peak kW | 5 | 4 | 6 | 7 | 8 | 9 | 9.5 | 10 | 9 | 11 | 7 | 7 |
| Last Year's Billed kW | 8 | 8 | 8 | 8 | 8 | 6 | 8 | 8 | 8 | 8 | 8 | 8 |
| Actual Peak kW | 2.016 | 2.153 | 1.483 | 4.5 | 3 | 10 | 8 | 9 | 10 | 11 | 8 | 7 |
| Target Peak kW | 11 | 10 | 10 | 10 | 10 | 10 | 10 | 10 | 10 | 10 | 10 | 10 |

FIG. 18

DEMAND TRIGGERS: HUDSON VIEW

| METER | TRIGGER WHEN DEMAND... | TRIGGER LEVEL | RUN SCENE | SEND TO EMAIL | |
|---|---|---|---|---|---|
| Hudson View 1 ▶ | Rises above ▶ | 400.00 | Htr 1 off ▶ | jgrillo@nescorp.com | [delete] |
| Hudson View 1 ▶ | Rises above ▶ | 460.00 | All Off ▶ | jgrillo@nescorp.com | [delete] |
| Hudson View 1 ▶ | Rises above ▶ | 430.00 | Htr 1 & 3 off ▶ | jgrillo@nescorp.com | [delete] |

Add trigger   Save triggers

CLOSE

LATEST 15-MINUTE DEMAND BY METER

| METER | DATE AND TIME | DEMAND (kW) |
|---|---|---|
| Hudson View 1 | Wed. Mar 16, 2005 12:14 pm | 76.32 |

FIG. 19

SCHEDULE EDITOR: WAY COOL POWER INC.

This Schedule currently has no Schedule Items configured.
[New item] [Save schedule]

| ITEM TYPE | TIME SPECIFICATION | SCENE | USE | ACTION |
|---|---|---|---|---|
| Every day ▼ | Every day at [00 ▼] [00 ▼] | ,run: No options available. | ☐ | [delete] |

If there are no Scenes available, you will need to go to the Zone Control page and create some.

[New item] [Save schedule]

| ITEM TYPE | TIME SPECIFICATION |
|---|---|
| Every weekday ▼ | Every weekday at [00 ▼] [00 ▼] |

If there are no Scenes available, you will need to go to the Zon

| ITEM TYPE | TIME SPECIFICATION |
|---|---|
| Every X hours ▼ | Every [00 ▼] hours at [00 ▼] past the hour, |

If there are no Scenes available, you will need to go to the Zone Con

FIG. 21

REPORTS: WAY COOL POWER INC.

Demand Trigger Report
kWh Savings Report
kW Savings Report

Load Data Report

Start Day: March ▸ 16 ▸ 2005 ▸
End Day: March ▸ 16 ▸ 2005 ▸
Meter: Hudson View 1 ▸
Display  Download CUSTOMER: HUDSON VIEW
FACILITY: HUDSON VIEW
ACCOUNT NUMBER: 65748
METER: HUDSON VIEW 1 (PW023-1)
REPORT FOR: REPORT FOR: MARCH 16, 2005 TO MARCH 17, 2005
REPORT GENERATED: WEDNESDAY, MARCH 16, 2005 10:15
Day  Date  Time  Previous Demand    Current Demand    Trigger Demand    Scene run kWH SAVINGS REPORT: HUDSON VIEW Year: 2005 ▸
Meter: Hudson View 1 ▸
Display  Download

FIG. 23

WIRELESS INTERNET POWER CONTROL SYSTEM

This application is a continuation in part of U.S. patent application Ser. No. 10/700,058, filed Nov. 4, 2003, now U.S. Pat. No. 7,167,777 entitled "Wireless Internet Lighting Control System."

BACKGROUND OF THE INVENTION

1. Field of the Invention

The present invention relates to control systems, and more particularly to a wireless energy control system for monitoring, controlling and procuring power.

2. Discussion of the Related Art

Various lighting control systems are known that offer fully automatic and energy efficient lighting control or switching. These systems include settings that are preset by a user to activate all or a portion of the lights within a room upon detecting an occupant. These lighting control systems may also adjust the illumination level at particular locations to save power.

Internet-based home communications systems are also known that permit a homeowner to monitor and control various features of their home from a remote location using a plurality of control devices positioned within the home and connected to a control unit in communication with a global computer network. These systems allow a homeowner to view, monitor, and/or control features of their home, such as adjusting the thermostat for the interior of the home or turning a light on/off, through a web page.

However, these control systems fail to provide energy control with automated operation, statistical analysis and diagnostic capabilities which function to manage utility loads and diagnose various utility operation parameters based on a combination of environmental energy conditions (for example, energy pricing) as well as predetermined user-defined schedules.

SUMMARY OF THE INVENTION

Accordingly, the present invention is directed to a wireless energy control system that substantially obviates one or more of the problems due to limitations and disadvantages of the related art.

An advantage of the present invention is that it provides an energy control system that automatically operates to control energy consuming devices, based on a combination of energy conditions and predetermined user-defined schedules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2A and 2B illustrate a wireless control module according to an embodiment of the invention;

FIG. 6C illustrates a lighting schedule according to an embodiment of the invention;

FIG. 11 illustrates an exemplary new customer editor interface according to an embodiment of the invention;

FIG. 12 illustrates an exemplary building information interface according to an embodiment of the invention;

FIG. 13 illustrates an exemplary user editor interface according to an embodiment of the invention;

FIG. 14 illustrates an exemplary meter editor interface according to an embodiment of the invention;

FIG. 15 illustrates an exemplary router editor interface according to an embodiment of the invention;

FIGS. 16, 17A and 17B illustrate an exemplary zone editor interfaces according to an embodiment of the invention;

FIG. 18 illustrates an exemplary energy demand interface according to an embodiment of the invention;

FIG. 19 illustrates an exemplary demand set point interface according to an embodiment of the invention;

FIG. 21 illustrates an exemplary schedule editor interface according to an embodiment of the invention;

FIG. 23 illustrates an exemplary report interface according to an embodiment of the invention;

DETAILED DESCRIPTION OF THE ILLUSTRATED EMBODIMENTS

Reference will now be made in detail to an embodiment of the present invention, example of which is illustrated in the accompanying drawings.

Figure 1:
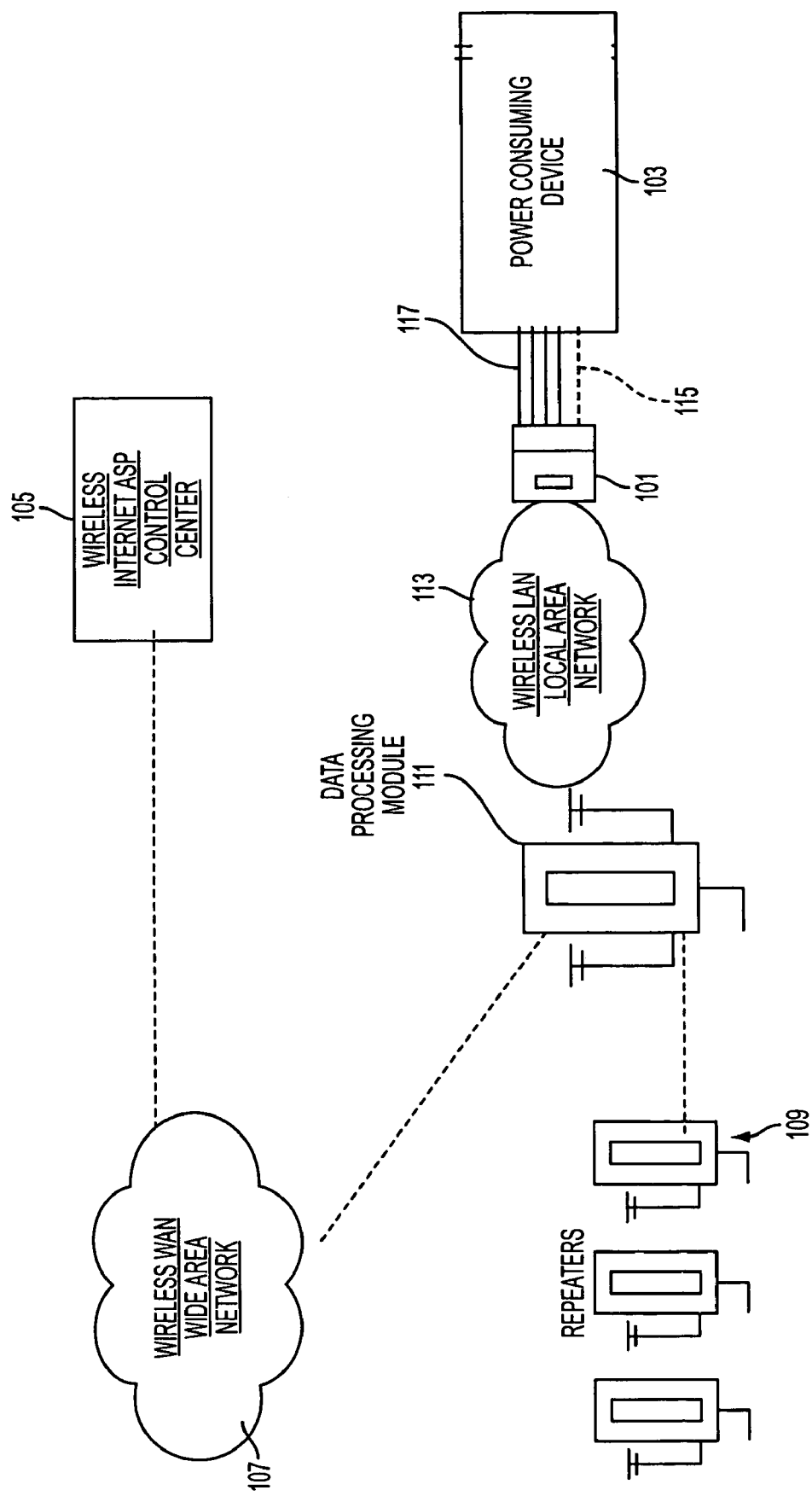
FIG. 1 illustrates a wireless energy control system according to an embodiment of the invention.

FIG. 1 illustrates a wireless energy control system (WECS) in accordance with an embodiment of the present invention. As illustrated in FIG. 1, the WECS includes a wireless control module (WCM) 101, a plurality of controllable devices 103, a data processing module 111, a wireless internet active service provider (ASP) control center 105, and a plurality of repeaters 109.

The plurality of controllable devices may include, for example, a lighting ballast, a motor, or HVAC device. The controllable devices 103 may interface with the WCM 101 in many different configurations including: a low voltage (e.g., 0 to 10 volt) interface; a power line carrier interface; a digital addressable lighting interface (DALI) to control the ballast based on power level as well as provide extensive system feedback; and a hybrid interface which may be any combination of the low voltage, power line carrier or DALI interfaces. A variety of inputs and selective outputs may be configured from the controller as well. For example, if the controllable device is a lighting ballast, the ballast may respond to different levels of power based on the voltage or signal received from the WCM such that 0 volts is fully "off", 5 volts is 50% power (50% dimming), and 10 volts is fully "on". In addition, if the device is a light harvesting sensor or motion sensor, the wireless controller may be preprogrammed to receive an input signal defining the current state of the sensor, for example 0 to 10, and the controller sends out a 0 to 10 volt signal based on the new setting given by the system.

The wireless control module 101 is the main interface between the controllable devices 103 and the data processing module 111 via communications link 113. The communications link 113 may be a wireless local area network (LAN) or wide area network (WAN) connection.

FIG. 2 illustrates an expanded view 200 of a wireless control module 101 in accordance with an embodiment of the present invention. As illustrated in FIG. 2, the wireless control module 101 includes a potentiometer 204, a microcontroller 206, an RF radio cartridge 208, an antenna interface 210, an RJ-jack or network connection and various control connections 202.

The potentiometer 204 produces the signals, voltages and/or resistance needed to control a particular device. These signals, voltages, and resistances may be produced by multiple means including pulse wave modulation or a series of R2R resistors. The microcontroller 206, in addition to holding the memory and logic of the wireless control module, creates a unique digital address for communicating with the data processing module, and processes all the commands received via the RF decoder cartridge 208.

The RF radio decoder cartridge 208 is a wireless transceiver device adapted to connect portions of the wireless control module to the wireless LAN network. The RF radio cartridge decodes proprietary protocols, such as security codes, and transmits and receives control and diagnostic information to/from the data processing module 111. The RF radio decoder cartridge 208 transmits at multiple frequencies and multiple data rates. For example, the range may be from 433 MHz at 14.4 Kbs to 802.11 MHz at 5 Mbs. The antenna interface 210 may be a shielded cable that plugs into the WCM to allow multiple reception configurations including half wave, full wave and standard radio. The antenna interface 210 and the radio decoder cartridge are connected via a RJ-jack or network connection.

Figure 2B:
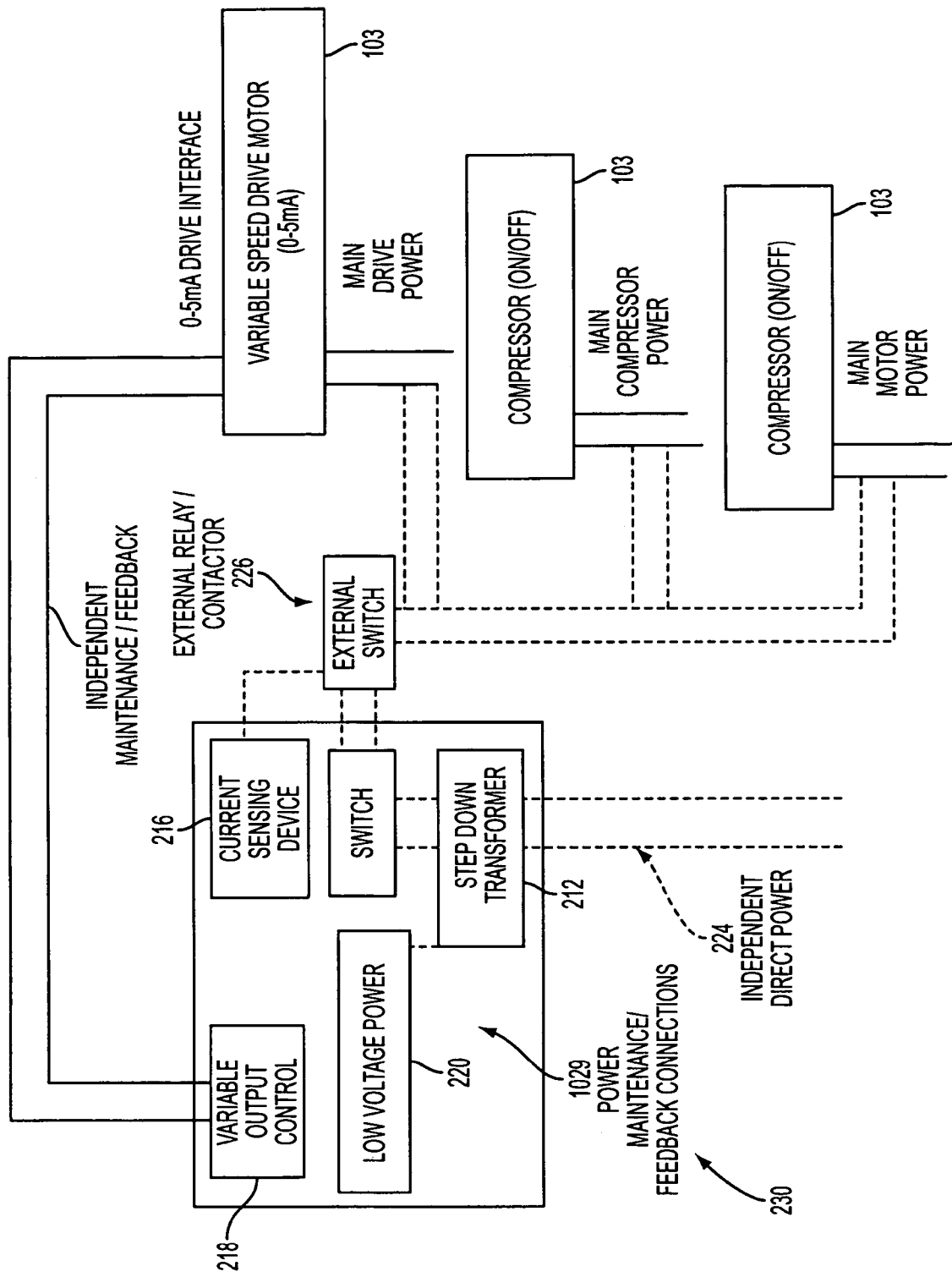

As discussed above, the wireless control module 101 may interface with the controllable device in various ways based on the type of device, for example a variable speed motor, compressor, motor, and/or lighting ballast. As illustrated in FIG. 2B, the wireless control module 101 has an independent power source 212 different from the controllable device 103. The independent power source may be a standard 120/277 volt power supply in the United States, but may also facilitate step-up or step-down power transformation (not shown) to accommodate 347 volts in Canada and a wide range of voltages in Asian and European countries. The power from the independent power supply is distributed in two directions. After entering a step-down transformer 212, low voltage power 220 is distributed in a first direction to power the internal components (not shown) of the wireless control module 103. The internal components may operate on a variety of low voltage sources; however, 24 VAC is the base standard. The high voltage power from the step-down transformer 212 is connected to a switch 214. The switch may be a solid state switch or an electronic triac to perform line switching. The output power from the switch 214 is fed to an external switch 226, for example, a relay or a contactor interface, to control power to the controllable device 103. The external switch 226 directly energizes or de-energizes power consuming devices within a facility, such as A/C, motor systems or other controllable devices. The external switch 226 allows the wireless control module to control larger relays sized to control larger power sources than can be controlled with the a single internal switch due to the greater amperage of the energy loads.

The wireless control module 101 further includes a variable output/input control 218 for providing various low voltage outputs, for example, 0-5 mA for interfacing with variable speed drives, 0-15V for interfacing process control systems, and 0-12V for interfacing standard building management systems.

The circuit board design of the WCM allows high frequency switching and control of the solid state switch, relay or electronic triac 214. The high frequency switching and control allows for dimming of standard non-dimming ballast (where the controllable device is a lighting ballast). Analog or digital controlled dimming may be available through the variable output control 218 using an n-bit microcontroller, for example, an 8-bit microcontroller that provides a 256 step dimming process for smooth dimming transitions. In particular, 256 steps of dimming may be integrated into the design of the dimming control features. The variable output control 218 may also facilitate a custom dimming configuration that does not operate from an internal 0-10 volt processor. Specifically, there may be an alternative means to provide the dimming control through an X-10 based power line carrier transmission, wire line side dimming (i.e., a two-wire system) and supplied by the ballast manufacturer.

The wireless control module 101 may provide maintenance feedback to indicate, for example, a ballast and/or lamp failure within the wireless energy control system. In order to provide feedback, the current sensing device 216 is arranged in line with the main power source to the external switch 226 in order to poll the wattage to determine whether there is a power drop indicating a device failure in the system. If a failure is determined, then an alert may be sent to indicate the location of the failure.

Figure 3A:
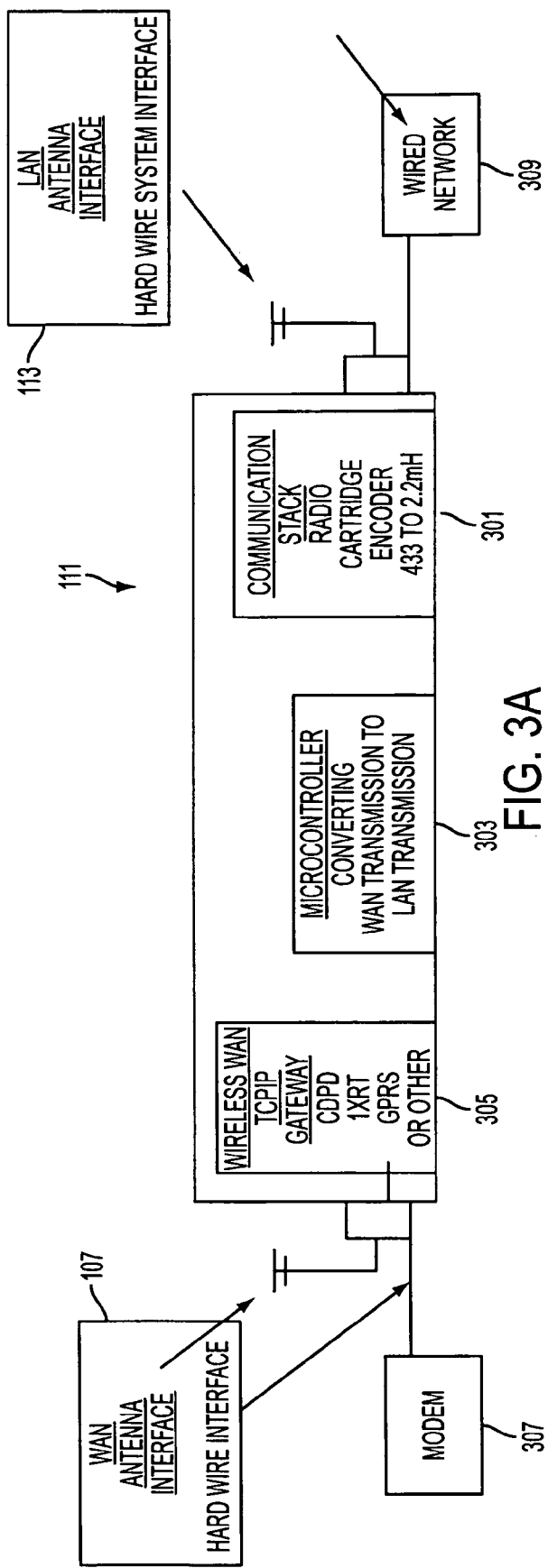
FIGS. 3A and 3B illustrate a data processing module according to an embodiment of the invention.
Figure 3B:
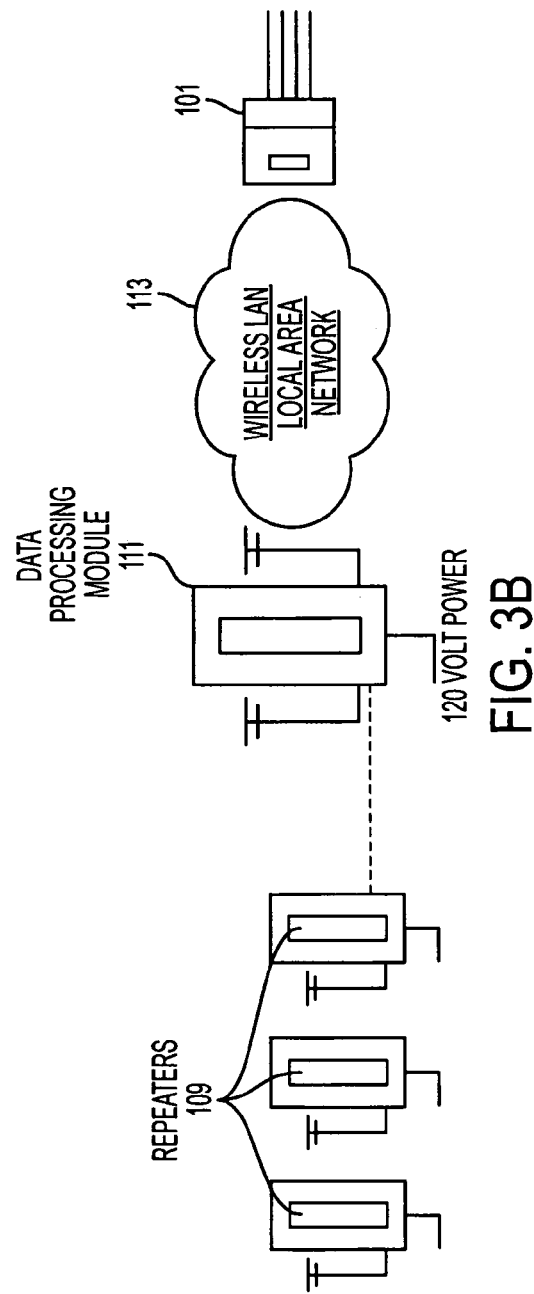

FIG. 3A is an expanded view of a wireless data processing (WDP) module 111 in accordance with an embodiment of the present invention. FIG. 3B depicts the WDP 111 in relation to the other components of the wireless energy control system of the present application. The WDP 111 is a transceiver that acts as the wireless gateway to the internet active service provider control center 105 thereby connecting the WCM 101 to the internet ASP control center 105. The WDP 111 includes three sections that perform various functions.

As illustrated in FIG. 3A, the wireless data processing module 111 includes, a communication stack 301, a microcontroller 303, and a wireless gateway 305. The local communication stack or radio cartridge encoder 301 provides security and proprietary protocol, data transfer and diagnostic information such that the wireless transmissions are encoded at the WDP module and decoded at the WCM by the radio decoder cartridge 208. The transmissions may be a wired or wireless (e.g., infrared) scheme. As illustrated in FIG. 3A, the radio cartridge encoder 301 is a wireless transceiver device that may connect other devices to the WCM via a hard wired network 309 or via a wireless local area network 113. The radio cartridge encoder 301 may transmit at multiple frequencies at both fast and slow data transfer rates. For example, the multiple frequency range can be from 433 MHz at 14.4 Kbs to 802.11 MHz at 5 Mbs. In addition to wireless communications, the system may also be configured to interface into select hardwire mediums. Hard wired solutions could be one or two addressable low voltage connections that are directly hardwired into the microcontroller 303, as well as X-10 power line communications. In addition, communication and integration can also be achieved through infrared wireless technologies or radio technology.

A microcontroller 303 contains the memory and logic of the WDP module 111. The microcontroller 303 bridges the two wireless networks, LAN 113 and WAN 107, and converts the proprietary protocols and data "wrapper" from the WAN 107 to the LAN 113. Further, the microcontroller 303 controls the traffic flow, the system logic and the memory required to operate the entire wireless energy control system locally, for example via an intranet or local computer, in the event of a disconnection from the ASP control center 105 or power loss.

The microcontroller 303 may include two main processor components (not shown) that may be added in order to facilitate "total" local control or "limited" local control. With "total" local control, there is a hard embedded operating system, for example a Linux Operating System, which has the processing power to drive direct software applications that are microprocessor-based. The hard embedded operating system would permit a full set of application software, similar to the HTML-based GUI software, to be operated locally and interfaced through to the WDP module 101 via a LAN connection. The software application GUI would be provided and installed on the local computer in order to process and control commands. The "total" local control configuration provides full control without the need of a wide area network and a HTML based GUI because control of the system would be facilitated from the local networked computers instead of the internet GUI.

With the "limited" local control configuration, the microcontroller has an embedded RAM memory chip that can operate specific scheduling functions without the need of the master GUI from the internet. For example, if communication to the main network is lost, the local data processing unit would be able to perform standard schedules and operations without using the internet ASP control center 105.

The wireless WAN TCPIP gateway 305 connects the WDP module 111 to the ASP control center 105. The wireless WAN TCPIP gateway 305 may use a variety of wireless communication means, for example, 3G wireless such as 1XRT, CDPD package data (analog), Reflex Paging Technology, and GPRS communication means. The system may also work from standard telephone lines that are controlled through a bank of modems 307 that connect to a hard wired system.

A static TCPIP session may be set up between the wireless WAN gateway 305 and a network operation center 501 (FIG. 4) which is a server located on the ASP control center 105. Once the static TCPIP session is locked into a static IP address, various information, such as security, protocol translation, data transfer, diagnostic reports, schedules and two-way control may occur between the WDP module 111 and the ASP control center 105.

Figure 4:
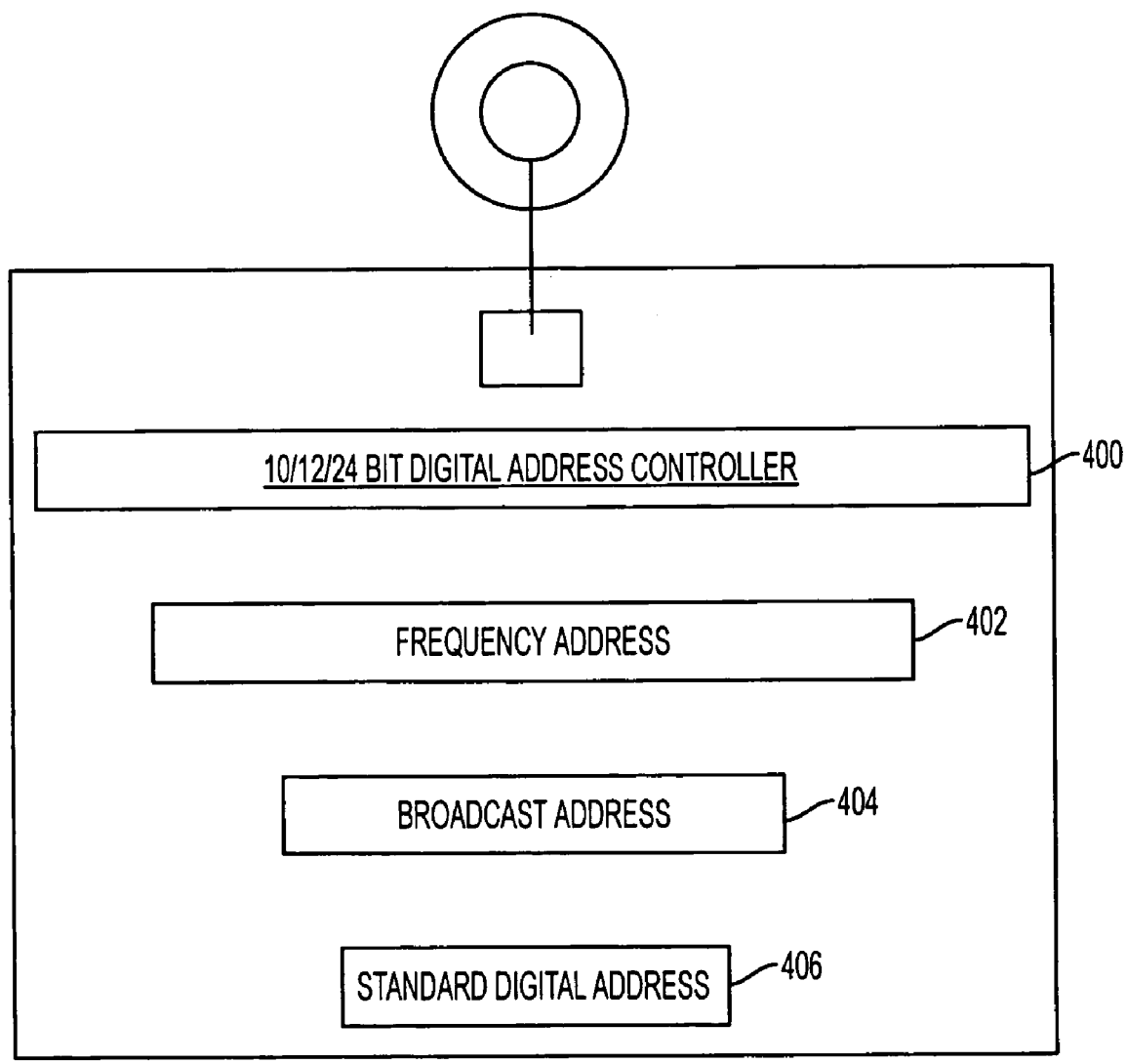
FIG. 4 illustrates a digital address control and hierarchy according to an embodiment of the invention.

The WDP module 105 provides various functionality. For example, the WDP module 105 may include digital address control. As illustrated in FIG. 4, the digital address control 400 may include, for example, three levels of control to prevent potential interference problems from occurring. The three levels illustrated in FIG. 4 include frequency address 402, broadcast address 404, and digital standard address 406.

To alleviate overlay of signals from other systems and to prohibit a potential zone command being controlled by a neighboring system, three distinct frequency ranges are provided to enable the system to be coded into three separate systems having identical infrastructures, however, operating on different frequencies. In the case of another system operating close by, the address configuration would be configured to a different frequency to alleviate signals associated with one system from controlling the address from another system. The design of the communication system works in concert with the repeaters 109. The digital address system architecture performs an automated polling sequence through the repeaters 109 in order to have all the addresses in the network identify their local address, broadcast address, and frequency. This polling sequence permits the system to poll through all the addresses that were sent information from the data processing module 105. The polling sequence further narrows the scope of the address throughout a building and thus, reduces the possibility of errors, wireless null sets, and misread data addresses by identifying in advance and polling only the points that were originally transmitted.

For the broadcast address configuration 404, the broadcast addresses divide the standard 8-bit microcontroller and set aside a certain amount of the address to become the broadcast address. This broadcast address will become a "master" broadcast to control each of the fixtures instantly from one main command given by the system. The broadcast digital address may be used to override local digital address commands and also have the ability to control the entire system instantly.

Based upon the instantaneous zone control and maintenance feedback systems of the present invention, the standard digital address divide the standard 8-bit microcontroller and set aside a certain amount of the address to become the standard address on the system. This standard address serves as the main address of the wireless control module and can provide a location of the device it controls throughout the network.

Figure 5:
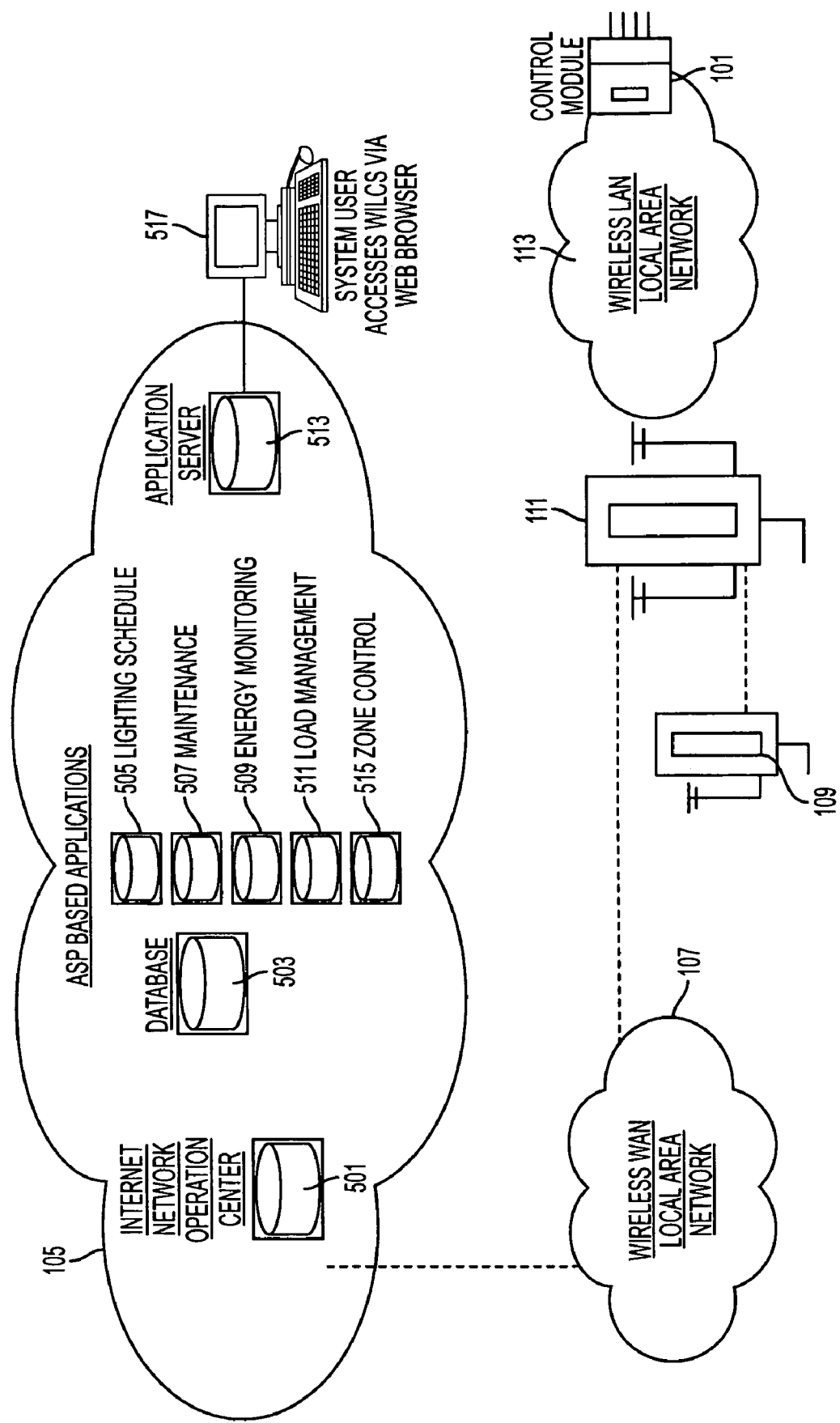
FIG. 5 illustrates a wireless internet application service provider control center according to an embodiment of the invention.

FIG. 5 illustrates the wireless internet ASP control center 105 in accordance with an embodiment of the present application. The wireless internet ASP control center 105 acts as the brain of the wireless energy control system (WECS) of FIG. 1. The wireless internet ASP control center is a server that operates individual ASP-based applications to facilitate various functions for the WECS. The wireless ASP control center 105 includes three main sections: a network operation center 501, a database server 503, and an application server 513.

The network operation center 501 of the wireless internet ASP control center 105 is the server that connects the wireless carrier and bridges the wireless internet ASP control center 105 to the WDP module 105, directly or via repeaters 109, for communication between the two devices.

The database server 503 of the wireless internet ASP control center 105 is the computer server that manages the WECS information such as particular building information, various system settings and data storage, zone control information, user names, passwords, and other critical information, and the like.

The application server 513 of the wireless internet ASP control center 105 is computer server that contains the actual applications that operate the functionality of the WECS. The application server 513 further controls the interfaces illustrates in FIGS. 7-23. There may be one or more applications that are available from the application server 513 for the control system. For example, there may be a scheduling application 505, zone control 515 for grouping of timed automatic or remote manual on/off control, energy monitoring 509, load management 511, maintenance 507, and miscellaneous other administrative functions.

With regard to the scheduling application 505, the WECS has the intelligence to calculate the amount that is being saved by a customer through, for example, light dimming, or A/C temperature adjustment. For example, once the internet ASP control center dims the lights, the WECS can calculate the savings attributable to the dimming and translate the savings to actual dollars saved by the customer. The actual dollars saved may be calculated on a month-to-month basis and generated in a report to demonstrate the continued savings of the WECS.

A sub-feature of the scheduling application 505 may include a lighting ramp-start process. Facilities typically do not have a system that ramps the lighting on at the beginning of each day in the way that mechanical systems may be operated. For example, a mechanical system may be programmed to pre-cool a building on a hot day or delay light operation until the building is fully occupied. However, with lighting, the lights are usually turned on as soon as the first person walks in the building. When operating a building on this premise, the entire building is lit approximately 3-4 hours before the building reaches 80% occupancy. In addition to the 3-4 hours in the beginning of the day, most commercial facilities only reach 80% occupancy during the day with employee vacations, travel, and general business activities. Thus, there are areas of the building that are not occupied and which remain lit during the entire day. Lighting ramp-start is a technique provided by an embodiment of the present application in which the lights are ramped up in the morning. That is, the lights are gradually activated with respect to brightness and/or location. The wireless energy control system will systematically turn on all the lighting in the building at the appropriate time and level. Further, the wireless energy control system has the intelligence to calculate the savings attributable to ramping the lights, and the savings associated with keeping the lights off throughout the building in areas in which there is no need for lighting. The amount of money saved using the ramp-start sub feature may be calculated on a month-to-month basis and used to generate a report to demonstrate the continued savings of the system.

A second sub-feature of the scheduling application 505 may include a Light Sweeping process. Unlike mechanical systems, facilities, such as commercial or industrial, do not have a system that shuts the lights off at the end of the day. In fact, a mechanical system may be programmed to a set-back mode at night. However, with lighting, as soon as the last person leaves the building, the cleaning company usually occupies the building for approximately four to five hours based upon the cleaning crew's schedule. As such, the lighting in the building may stay on until the cleaning company is finished. Thereafter, the lights are shut off. Based upon this scenario, the lights in a building are being operated an extra four-to-five hours per day. Light Sweeping is a technique of the wireless energy control system in which all the lights in the building are "swept off", i.e., turned off in a first portion of the building and gradually continued to other portions of the building, at the close of the business day. The wireless energy control system (WECS) will systematically shut down all the lighting in the building and then make sure the lights are off by a certain time through the night. The WECS further has the intelligence to calculate the amount of energy being saved by the customer through the Light Sweeping process. Further, the WECS can calculate the savings and translate the savings as a result of keeping the lights off throughout the building. The savings due to the Light Sweeping process may be calculated on a month-to-month basis, and used to generate a report to demonstrate the continued savings of the system. Although the above descriptions illustrates various functionality regarding lighting control, the WECS may provide similar functionality with regard to other power consuming systems such HVAC.

With regard to the energy monitoring application 509, through the wireless control module 101, the wireless energy control system (WECS) can monitor and control the amount of power consumption for the lighting system. Through a direct interface with macro control systems such as Omni-Link System of Powerweb, Inc., described in U.S. Pat. No. 6,311,105 and U.S. Pat. No. 6,122,603, hereby incorporated by reference, the energy from an electric meter as well as the cost of electricity in the market may be monitored. The energy monitoring application 509 may calculate monthly performance statistics on how much energy was saved by using the WECS. In addition, the system will monitor the price of power and allow the end user to automatically shed load in order to reduce power consumption to save on a real-time price rate or participate in a demand response event. The load and reduction statistics will be transmitted to the system, stored in the load management database 511 and be available to allow customers to predetermine the financial benefit of reducing lighting load and/or participating in load response.

With regard to the Zone Control application 515, because of the digital addressable configuration of the wireless control module 101, each controllable device may be wirelessly grouped and/or zoned with other devices to form virtual zones within a building. The operator of the internet ASP control center 105 can assign different zones to various occupants throughout a facility. A group of fixtures or ballasts can be controlled or a single, individual fixture may be controlled via the wireless internet interface. The internet ASP control center 105 further includes the capability to design and format an entire facility from the internet. A facility may be entered into the internet ASP control center 105 and the WECS will activate the user or groups of users within the building.

Figure 24:
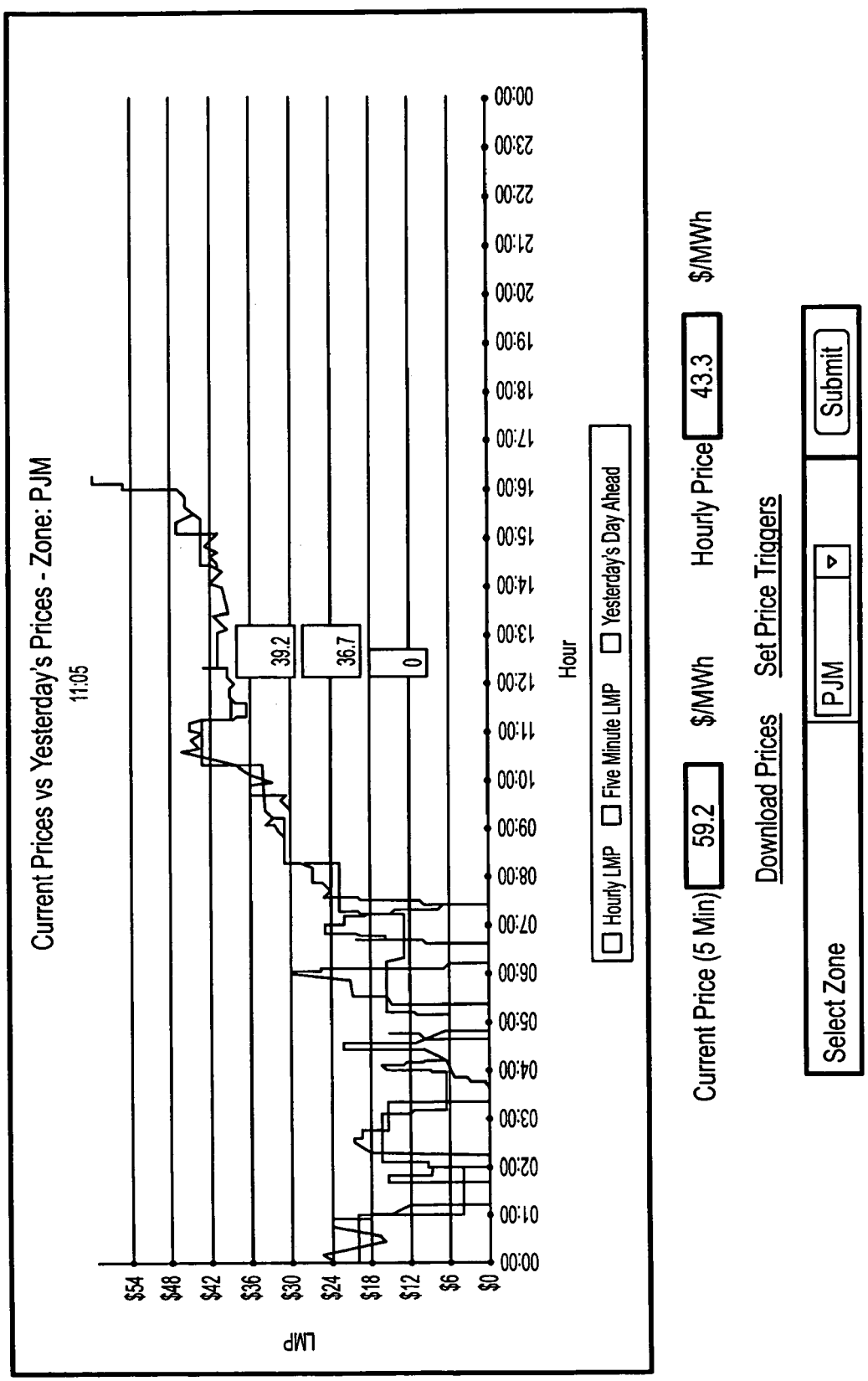
FIG. 24 illustrates an exemplary energy pricing interface according to an embodiment of the invention.

With regard to the Load Management application 511, the wireless energy control system offers the facility operator permanent load reduction in their energy costs. The wireless energy control system in conjunction with a system such as the Omni-Link system may monitor the price of power in the market and modify the lighting system to offer consumers reduced load profiles and cheaper electricity prices as illustrated in the screen shot of FIG. 24.

With regard to the Maintenance application 507, the wireless energy control system offers two-way feedback to the internet ASP control center 105. The wireless control module 101 is designed to detect various currents in the devices to determine maintenance issues within the system. The wireless energy control system will send an alarm to an operator in the event of a failure, and may also send the location of the failure.

Figure 6A:
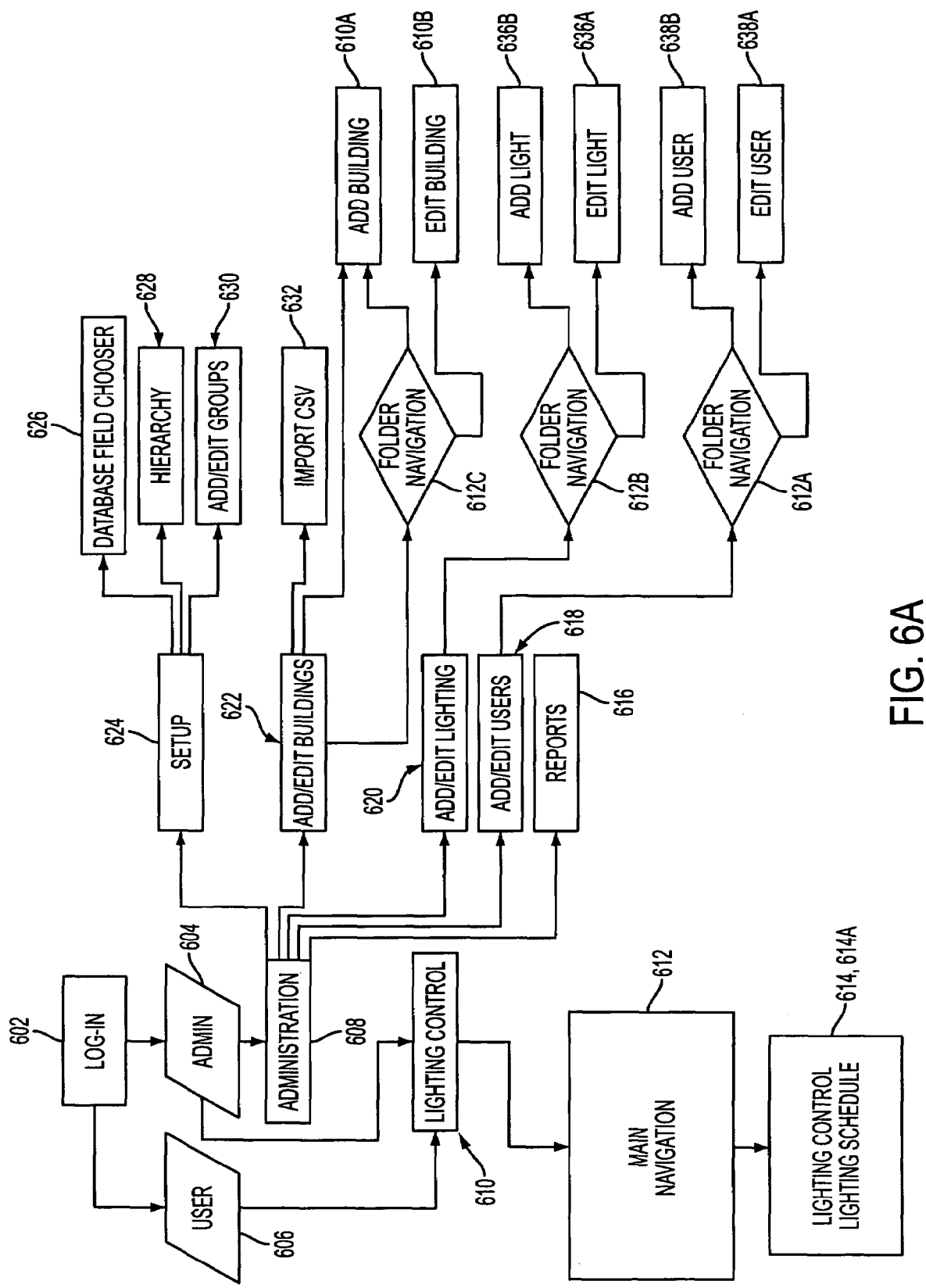
FIG. 6A illustrates processes of the software of the wireless energy control system according to an embodiment of the invention.

FIG. 6A illustrates lighting software logic and processes for the ASP control center in accordance with an embodiment of the present application.

Figure 7:
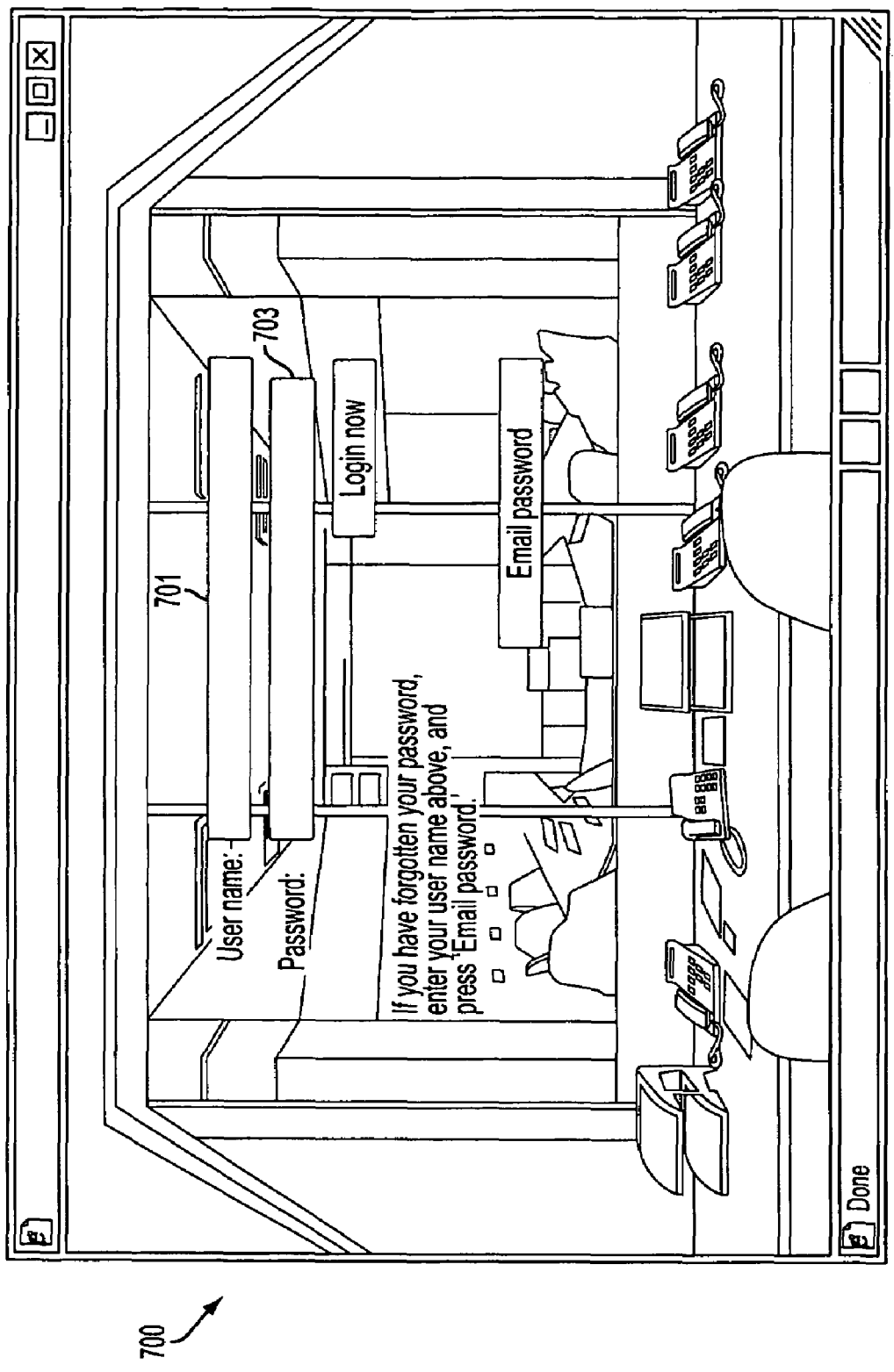
FIG. 7 illustrates an exemplary log-in interface according to an embodiment of the invention.
Figure 8:
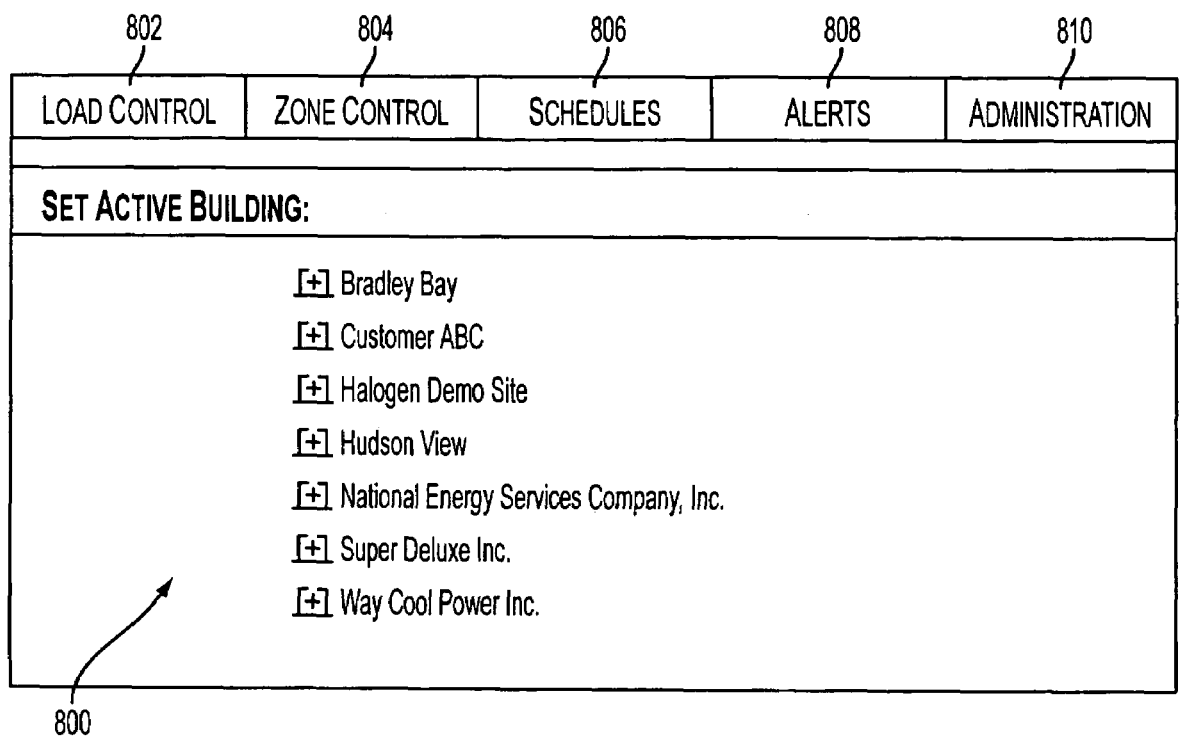
FIG. 8 illustrates an exemplary building selector interface according to an embodiment of the invention.

At 602, the system is designed to have all proper log-in tools for end users as well as administrators. The Log-in page, for example, as illustrated in FIG. 7 prompts a user for log-in and password information. User and password information will be generated and distributed manually by an Administrator. Upon successful log-in, the user is redirected to the Administrative Control Center interface, for example, as illustrated in FIG. 8. If log-in is unsuccessful, the log-in page is redisplayed with an error message. If the user is an Administrator and the log-in is successful, the user is granted access to the Administrative link.

At 606, the user is defined on the system as an end user person who has a password and can control an individual lighting system or a particular zone lighting control on the system. User and password information will be generated and distributed manually by an Administrator.

Figure 6B:
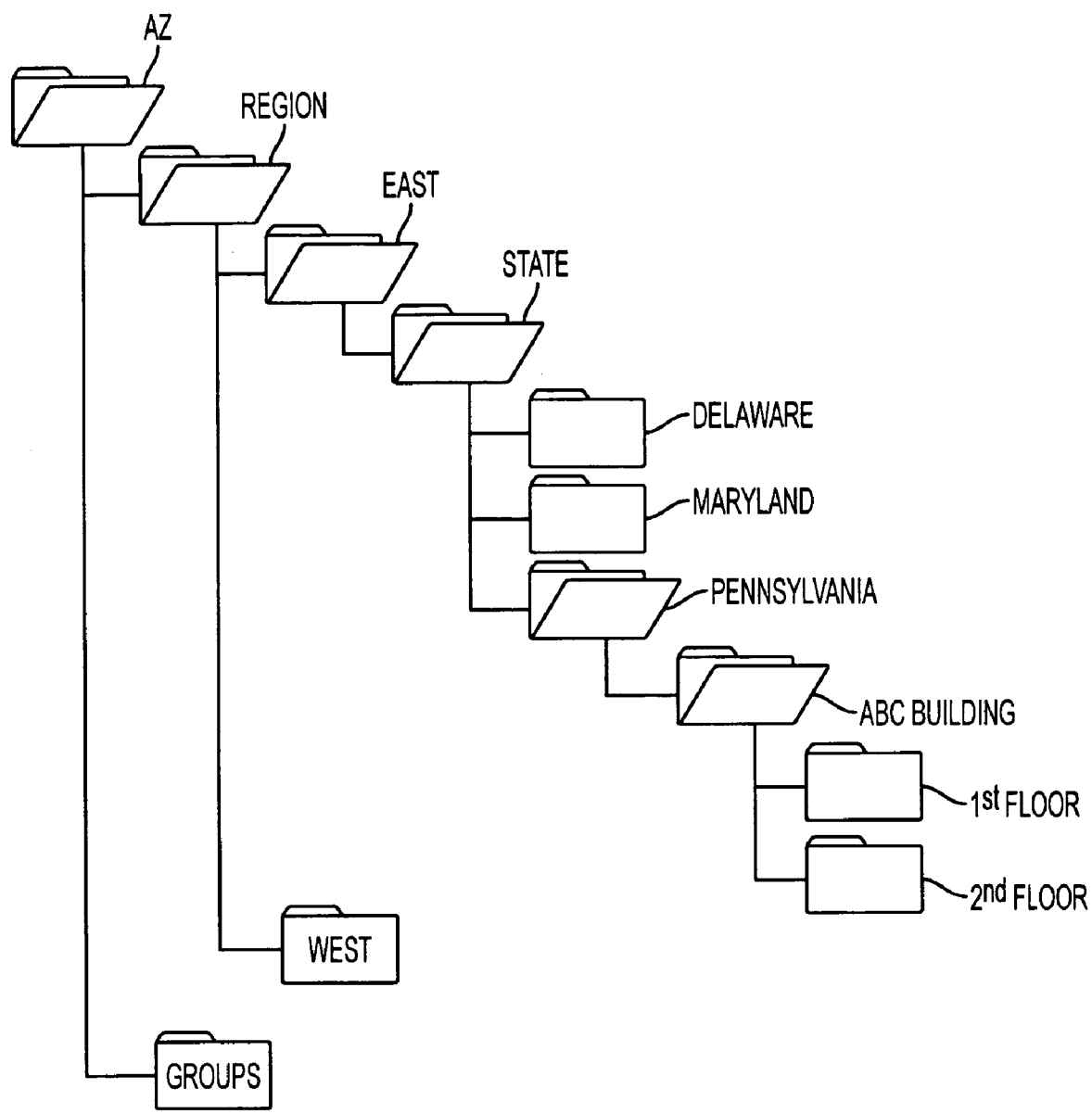
FIG. 6B illustrates folder navigation of the software according to an embodiment of the invention.

At 612, 612A, 612B, 612C, navigation tools allow the user to navigate through all aspects of the system and at all levels of control. All forms created on the system will result in the display of a confirmation, before final submission. Navigation to buildings (edit or control), Lights (add, edit or control) or users (add or edit) will be via a list display containing hyperlinked headers for resorting buildings by column. A limited number of records will be displayed, with start/end/next/previous links for navigating list. Folder GUI display using stored hierarchy will display subfolders/buildings as folders are clicked. Administrator can link at any GUI level to access all administrative functions and set temporary levels, and set schedules. FIG. 6B illustrates the folder diagram and layout of the folder navigation for 612A, 612B and 612C.

Returning back to FIG. 6A, at 604, the software administrator can set up all the administration functions on the system. The administration functions include design and edit buildings, zones, groups, lights, schedules and light intensity on the system.

Figure 9:
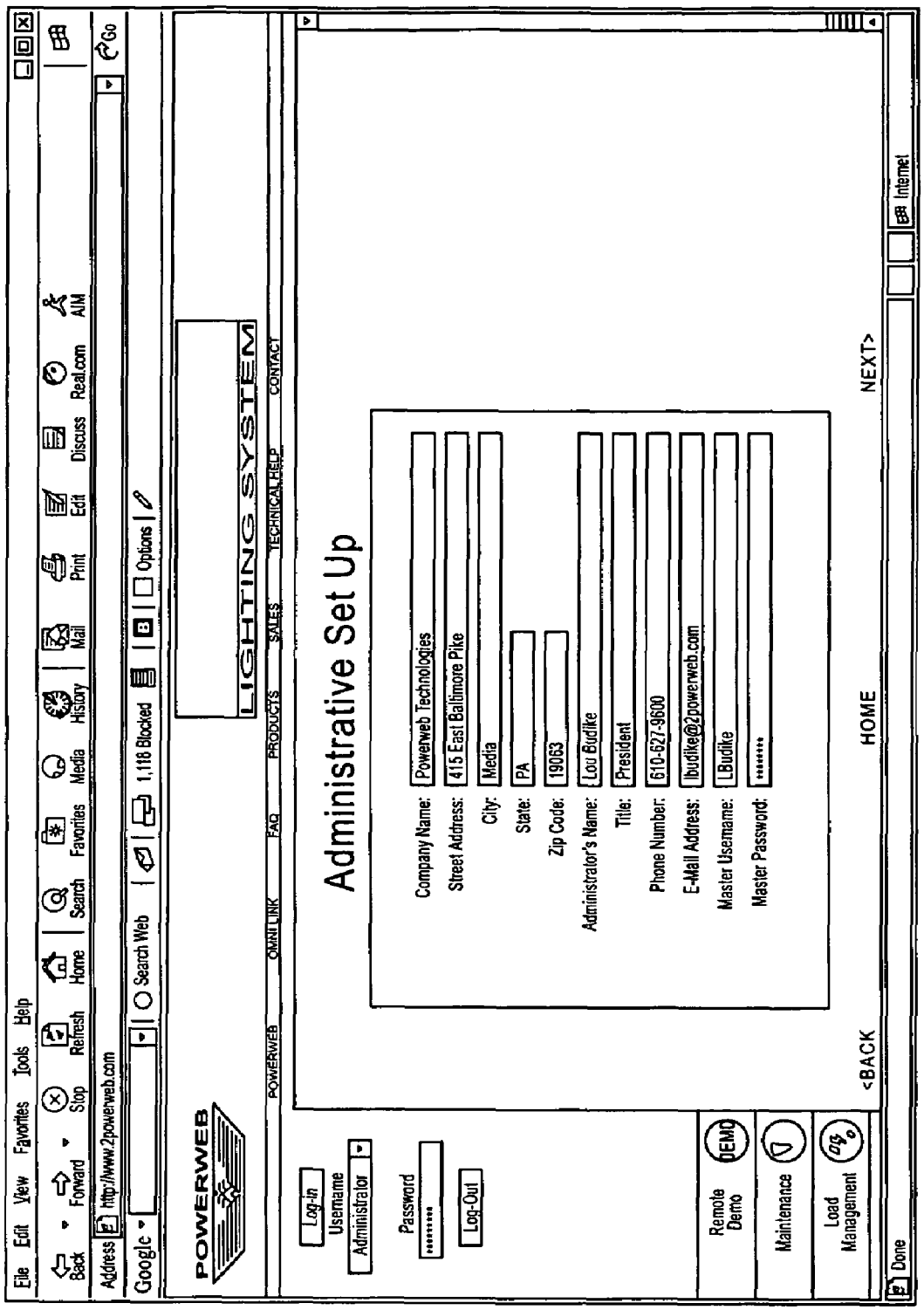
FIG. 9 illustrates an exemplary administrative set-up interface according to an embodiment of the invention.
Figure 10:
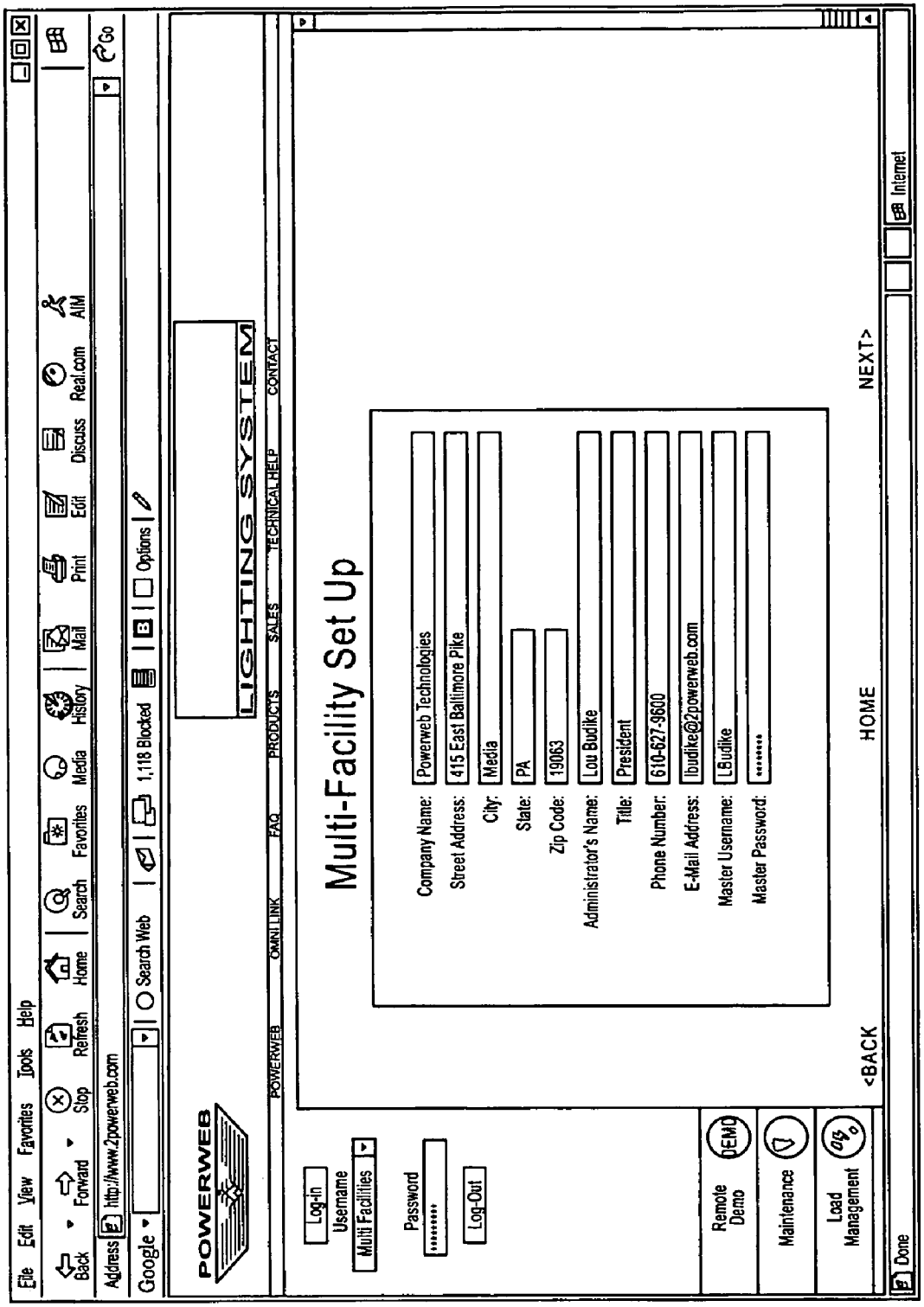
FIG. 10 illustrates an exemplary multi-facility set-up interface according to an embodiment of the invention.

At 608, the software administration will allow the administrator to select and set up fields that will be used throughout the application. These fields set up the administrative functions for the platform. Default fields will be listed in form with select boxes for selection, while custom fields will contain text input boxes for custom names. Settings will be stored in a table in the database. The administration information that may be stored in the database may include: Building Name, Street Address, City, State, Zip, Contact Name, Contact Phone Number, Contact E-mail address, Lighting unit address, Lighting unit floor, Lighting unit zone, Lighting unit Common Name, Custom field 1 (Example: Region, Zone), Custom field 2, and Custom field 3, for example, as illustrated in FIGS. 9 and 10.

At 614, the system will be designed to schedule lighting by: selecting the hierarchy level, building, or lighting unit through list or folder navigation; selecting times and lighting levels (i.e., 4 weekday settings, 4 weekend settings), selecting sunrise and sunset for each configuration as shown in FIG. 6C. Separate schedules may be set for each lighting unit, or set for any point in hierarchy, or group. Changing schedules for group or hierarchy levels will replace previous schedules set for individual/group, or hierarchy level lighting units.

At 614A, the system will be designed to control and schedule lighting by: selecting the hierarchy level, building, or lighting unit through list or folder navigation, selecting lighting level desired. Level will return to scheduled level at next scheduled level change. The Administrator may set temporary lighting level(s) for any point in hierarchy and may use temporary override to lock out users ability to change lighting levels.

At 624, the Set Up field is the field that sets the criteria for a data field chooser, the hierarchy, and the multiple building groups on the system. The set up 624 sends stored information to be sorted back into the database for logic decisions.

At 628, the Field Chooser will allow the administrator to select and set up fields that will be used throughout the application. Default fields will be listed in form with select boxes for selection, while custom fields will contain text input boxes for custom names. Settings will be store in a table in the database. Field chooser information stored in the database may include: Building Name, Street Address, City, State, Zip, Contact Name, Contact Phone Number, Contact E-mail address, Lighting unit address, Lighting unit floor, Lighting unit zone, Lighting unit Common Name, Custom field 1 (Example: Region, Zone), Custom field 2, and Custom field 3.

At 628, the system is designed to automatically set up a hierarchy in the system. The hierarchy is set up by a form that will ask how many levels (or additional levels) of control are desired. The Administrator is presented with a form containing a dropdown boxes for each level of control desired. The dropdown boxes will contain selections designated by the field chooser. (Example: Region, State, Zip) The selected setting will be stored in a table in the database. Once these updates are made, the changes are stored in the navigation menu.

At 630, an Administrator can create groups containing one or more buildings as members. The Administrator can add and remove buildings from a group. Buildings can be in multiple groups. A list of groups will contain buttons/links to edit/delete. A display button/link at the bottom of the page will be there to add a new group. Add/Edit group forms will contain dropdown boxes containing distinct query results from database as designated by the field chooser. For example a zip code dropdown box will contain all distinct zip codes. Once these updates are made these changes are stored in the navigation menu.

At 610, 610A, and 610B, an Administrator can ADD or EDIT a building on the system by selecting the appropriate information from the drop down menu and entering this information into the system. The Administrator can add and remove buildings from the system. List of Buildings will contain buttons/links to edit/delete. A display button/link at the bottom of the page will be there to add new group. Add/Edit Building forms will contain dropdown boxes containing distinct query results from database as designated by the field chooser. Add/Edit Building form will contain text box inputs for fields as designated in the field chooser Top of Form Building Name, Street Address, Region, City, State, Zip, Contact Name, Contact Phone Number, Contact E-mail address, Custom field 1 (e.g., Region, Zone). Once these updates are made these changes are stored in the navigation menu.

At 632, the import CSV is the interface to the other pricing and load management applications on the system. This function acts as a two way control that sends load data and energy price data into the system in order for the administrator to decide if it is an a appropriate time to shed load.

At 636, 636A and 636B, an administrator can ADD or EDIT Lights on the system by selecting the appropriate information from the drop down menu and entering this information into the system. A list of selected buildings is available through list or folder navigation. The Add/Edit Lighting form will contain text box inputs for fields as designated in the field chooser and will also input changes from the Edit side and save the new data within the database. The Add/Edit Lighting form will contain text box inputs for fields as designated in the field chooser such as Lighting unit floor, Lighting unit zone, Lighting unit, and Common Name.

At 638, 638A and 638B, users may be added or edited by: selecting the building through a list or folder navigation, selecting the appropriate lighting control for any hierarchical level, building or light level and selecting the form with the context box inputs designated from the Database field chooser.

At 616, the reports system is the feedback system that generates the reports back on the system for diagnostic and maintenance items that are picked up on the system. These maintenance items are sent to the reports link and reports are generated by the system detailing the maintenance items on the system.

Similar functionality to the lighting control described with reference to FIG. 6A-6C may be provided with regard to other controllable devices, such as HVAC systems, motors, and the like.

As discussed above, the wireless internet ASP control center provides the main control interface for the WECS. To achieve the functionality described above, multiple user interfaces are provided. Exemplary interfaces are discussed below with reference to the functionality they provide.

FIG. 7 illustrates an initial screen shot 700 of a log-in page for a wireless energy control system in accordance with an embodiment of the present application. As illustrated in FIG. 7, a user is prompted to log-in/out of the wireless energy control system by entering a user name 701 and password 703. The user name 701 may be one of a Facilitator, User and Administrator. An example of a Facilitator is a local building manager; while an example of an Administrator is an off-site building manager, for instance in another region. A User is an individual user of the system. Once the user name 701 is entered, a pre-determined password 703 is entered to complete the log-in to the system.

Based upon the user name 701, various administration options are available. For example, the Facilitator may be prompted to set-up lighting for a single building or local control zone set-up, and an Administrator may be prompted to set up lighting for multiple buildings.

FIG. 8 illustrates a screen shot 800 of an Administrative Control Center of a wireless energy control system in accordance with an embodiment of the present invention. In FIG. 8, the control center allows a user (Facilitator or Administrator) to control the scheduling within a building or a group of buildings. For example, the control center includes, but may not be limited to, options for scheduling operations during weekends, weekdays and holidays, or for a selected period of time.

Upon a successful login to the system, a user is prompted to select or set an active building. As illustrated in FIG. 8, the system may display various customers, 800 which have buildings controlled by the system. Again based on the security or access associated with the user, only those customers or buildings which they have authority to access/view will be displayed.

Selection of an active building, for example by clicking on the "+" icon next to a company name, will take the user to the main management interface for the WECS system. Navigation to other sections of the site may be achieved by selecting the appropriate item from, for example, a horizontal menu bar at the top of the screen, 802, 804, 806, 808, 810.

The control center is the main management interface to the wireless energy control system software system. From the control center interface, a user can link to various management functions by clicking the appropriate icon. For example, the use my link to load management, building schedules, administration, zone control and/or system alerts.

The software interface system is designed with user restrictions, as discussed above. Accordingly, certain functions may not be available based on the access level of the user. For example, standard users may not have access to administrative functions which are general reserved for higher level users and/or administrators.

Like the main interface, individual function interfaces may include links to more specific functionality. For example, the administration interface may include links to a customer edit, a user editor, a meter editor, router editor, zone editor, customer set wizard and demand peak editor.

FIG. 11 is an exemplary interface for the customer editor function. The customer editor interface allows the user to enter and modify customer records. For example, to edit a customer the user would click an edit customer link and to define a new customer, the user would click an add new customer link or icon.

FIG. 12 is an exemplary interface for the building editor interface. The editor interface allows the user to enter and modify customer records. For example, to edit a building the user would click the edit building link, and to define a new building for a customer, the user would click the add new building link. The building information form allows the user to enter data for each of the customer's buildings. It is important to accurately provide as much information as possible. For example, the building name which represents a descriptive name assigned to the building, building account which is typically the utility account number for the building, address, city, state, ZIP code, primary contact information for the facilities manager for the building and the like.

FIG. 13 is an exemplary interface for the user editor. The user editor interface allows the use to enter and modify system user records. FIG. 14 is an exemplary interface for the meter editor. The meter editor allows the user to enter and edit system meter records.

The system includes "real-time" meters that read energy consumption of the customer in order to send appropriate data to the control system to make energy reduction decisions based on load set points. The meter information is important for the system to track accurately. For this reasons, the system saves several key pieces of meter information. For example, meter id which is a unique id assigned to the meter, common name which is a descriptive name assigned to the meter, port which is the TCP/IP port number that the WMDP listens to, and the multiplier (kW/Pulse) which is the pulse multiplier provided by the electric utility.

FIG. 15 is an exemplary interface for the wireless router editor. The wireless router information is important for the system to accurately process communication between software and the wireless control modules. Key information to maintain may be the name assigned to the WCM, the IP address or hostname assigned to the WCM, the port, max number of retries before a Not Connected is reported, and the delay between consecutive commands sent to the router to prevent the ISI from getting ahead of the router's processing speed.

FIGS. 16, 17A and 17B are exemplary interfaces for the zone editor. Zones are groups of controllers connected to devices that can be controlled as a single entity. For example, all the rooftop AC compressors may be controlled as a zone or group rather than each being controlled separately. Specific time setting can be programmed into the zone control device as shown in drop down selection menu of FIG. 17A. Exemplary zone information includes the estimated energy usage when all devices in a zone are powered at maximum, the DIP switch setting that all the controllers in the zone should use, the router assigned to the zone and the like. The DIP switches may be mounted to the circuit board of each controller and are accessed via a small opening in the top of the controller. The chart shown in FIG. 17B illustrates exemplary switch settings for addressing the controllers.

FIG. 18 is an exemplary interface for the energy demand editor. The energy demand editor interface allows the user to enter and modify energy and demand set points both historical and real time of the customer's energy usage. The demand editor is used to build benchmarks and provide analysis to the customer on how well the system is performing energy savings. Exemplary energy demand information may include pricing date, such as the amount charged by the customer's local utility for distribution services, the amount charged by the customer's energy supplier, the On Peak and Off Peak Summer and Winter demand prices and the like.

FIG. 19 is an exemplary interface for the demand set point trigger editor. The demand set point trigger editor allows the user to enter demand set points in order for the system to automatically react to load curtailment. Demand triggers or set points allow the system to automatically response to varying load conditions. For example, when approaching predefined demand limits, the system will automatically run pre-configured scenes to reduce demand in order to stay within the demand limits. Set points are configured by selecting the set points button on the load control interface. Multiple triggers may be defined and set at varying level to tier load reduction and reduce demand. To define a new set point, the user may click/select the Add Trigger button. This creates a new line that allows configuration of the set point actions. Save Triggers will submit the changes to the system.

Exemplary set point trigger information includes, for example, the meter that will be monitor for the set point, whether action should be initiated with the meter rises above or below the specified trigger level, the pre-defined scene that is to be initiated to reduce the demand consumption based on the trigger.

Figure 20:
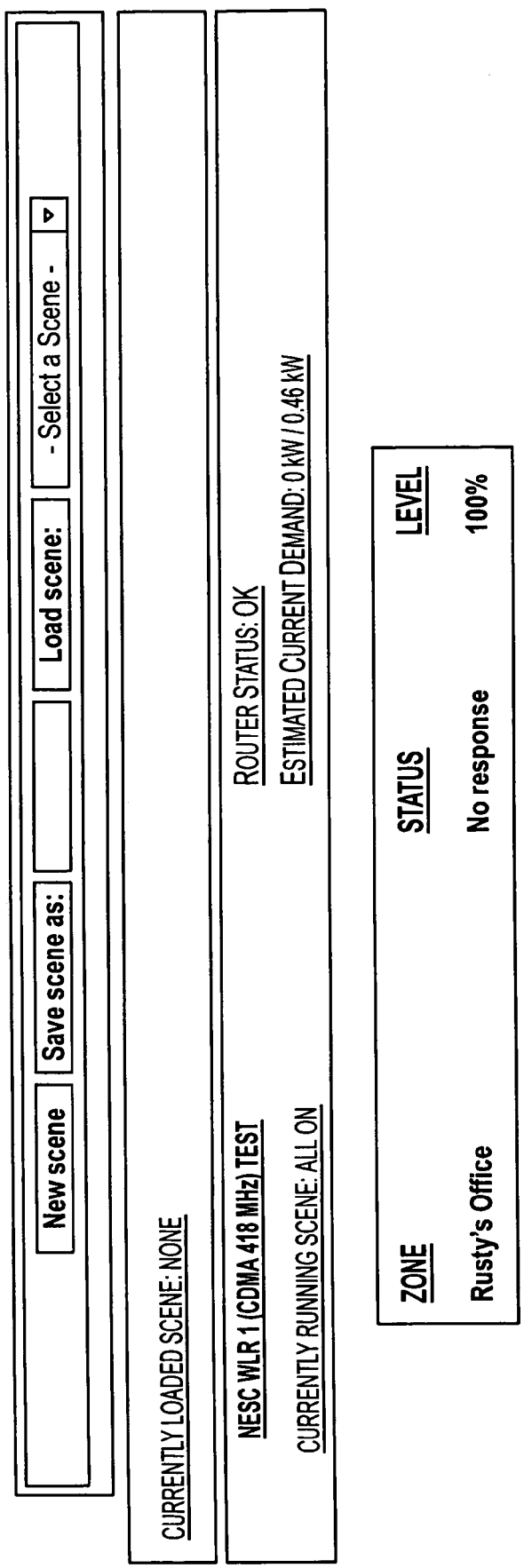
FIG. 20 illustrates an exemplary zone/scene control interface according to an embodiment of the invention.

FIG. 20 is an exemplary interface for the zone/scene control editor. The zone scene control interface allows the user to design customer zones and scenes for the system to operate the control modules in a multitude of schedules and configurations. The WCMs receive control commands form the ASP control center through the buildings wireless router. Groups of controllers, called Zones, can be controlled at the same time as discussed above.

Zones are defined by both the address assigned to the controller and the configuration of the device within the Zone editor. A scene may also be created in the system to control and schedule zones and individual controllers. In order to create a scene for a currently selected building, the user navigates to the zone controller section and selects the New Scene button or icon. Upon selection, various available zones will be displayed under the Zone window. If no zones are available, the user will need to create a zone by assigning controllers under the zone editor of the administration function.

The new level the user would like the zone to achieve may be defined by selecting the new level from a drop-down menu or the like. The level could range from Full Off to Full On, with dimming levels at 10% increments. The user may also define how long the selected levels are to be maintained by selecting the desired duration for example, from a drop down menu. The duration may run from 15 minutes to 2 hours. Finally, the user may set the priority from lowest (1) to highest (100). A zone command will only run if it has a higher priority than a currently running scene.

FIG. 21 is an exemplary interface for the building schedule control editor. The building schedule control interface allows the user to design customer schedules for the zones and scenes created in the system. The user may build and endless task of schedules through the scalable schedule feature. To create a new schedule, the user selects the new item link to create a new line item which can be modified to the desired schedule. Item Type defines the type of schedule to be created, for example, everyday, weekly, every weekday, every specific day, holidays and the like. The user may select every X hours allows the user to set the schedule to run every X hours according to the time specified/selected. Time specification allows the user to define the specific point in time the schedule is to begin.

Figure 22:
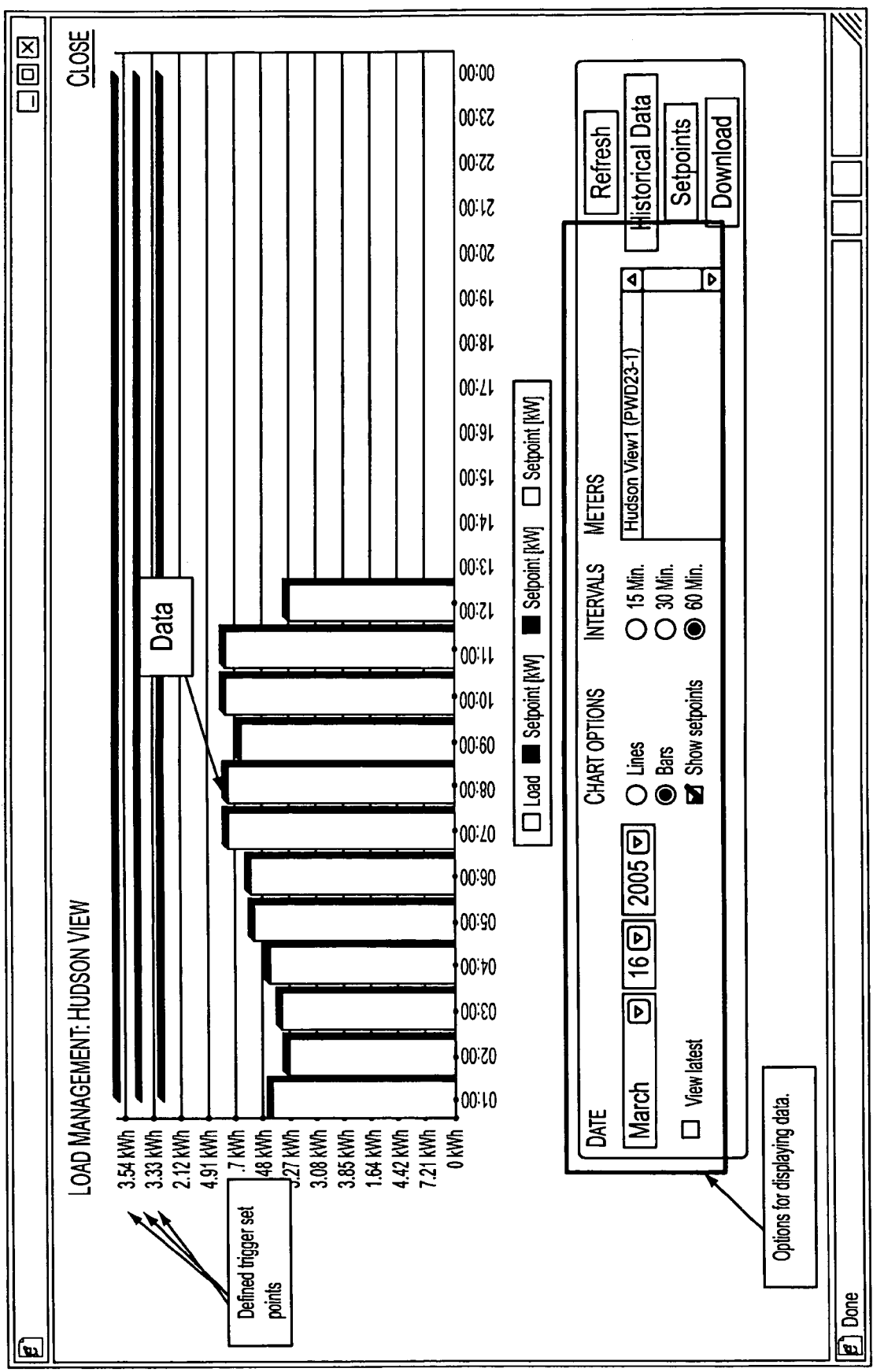
FIG. 22 illustrates an exemplary load management interface according to an embodiment of the invention.

FIG. 22 is an exemplary interface for the load management function. The load management interface allows the user to retrieve energy usage information from the system. Load control allows users to view real-time energy utilization or kW, in addition to viewing usage over time kWh. Furthermore, set points and triggers may be defined through this interface. Set points reduce demand by running pre-defined scenes.

The load control interface is made up of a main graphical window which displays data in graphical form, for example a bar or line graph chart depending on the options chosen. Hovering a mouse or other input device over the bars of the chart will show a smaller pop-up window containing the time and value of the item. If the active building has more than one meter, the user may use the Meters list box to select one or more meters from which to show data. If multiple meters are selected, their data will be shown in aggregate. Real-time data is displayed at predefined intervals based on the options selected by the user. The date, chart options, and meter may be changes to reflect the information that is of interest.

FIG. 23 is an exemplary interface for generating load energy reports. This interface allows the user to run critical reports regarding the operation of the system and the impact the system is having in controlling energy costs for the user. To run a report, the user only need select the desired report. The Demand Trigger Report is an exemplary report that lists all the demand triggers which fired during a selected time period for a selected meter. The report may also show the date and time each trigger was fired, the kW demand in the interval previous to the trigger firing, the kW demand when the trigger fired, and the kW demand level which had to be exceeded in order to fire the trigger. The kW Savings Report is another exemplary report that displays detailed information showing triggered and scheduled savings. For example, if you have a water heater on a zone with an 'est. load @100% of 5 kW and a trigger turns if off for two hours, the report would show the event under the kWh (triggered) column as a value of 10 kWh. The savings (triggered) would show what the estimated monetary savings are based on the rate values at the time of the event.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An energy control system for managing utility operation parameters comprising:
   a plurality of power consuming devices;
   at least one control module in communication with at least one power consuming device;
   a data processing module in communication with the at least one control module, wherein the data processing module includes a microcontroller arranged to convert wireless WAN transmissions from a wireless internet control center to LAN transmissions for forwarding to the control module; and
   the wireless internet control center in communication with the at least one control module via the data processing module and arranged to operate a plurality of utility operation applications.

2. The system of claim 1, further comprising a plurality of repeaters in communication with the data processing module.

3. The system of claim 1, wherein one of the plurality of power consuming devices is a compressor.

4. The system of claim 1, wherein one of the plurality of power consuming devices is a lighting ballast.

5. The system of claim 1, wherein the at least one control module is in communication with the at least one power consuming device via a low voltage interface.

6. The system of claim 1, wherein the at least one control module is in communication with the at least one power consuming device via an external switch.

7. The system of claim 6, wherein the external switch is relay.

8. The system of claim 6, wherein the external switch is a contactor.

9. The system of claim 1, wherein at least one the plurality of power consuming devices is a variable speed motor.

10. The system of claim 1, wherein the at least one control module includes a variable output control.

11. The system of claim 1, wherein the at least one control module includes a maintenance feedback portion to monitor and provide alerts when there is a ballast or lamp failure.

12. The system of claim 1, wherein the at least one control module comprises:
   a potentiometer arranged to generate signals, voltages and resistances to operate at least one of the plurality of power consuming devices;
   a microcontroller; and
   an RF radio cartridge decoder.

13. The system of claim 1, wherein the data processing module further comprises:
   a communications cartridge encoder adapted to provide secure transmission of data from the wireless internet control center via the communications link.

14. The system of claim 1, wherein the wireless internet control center comprises:
   a network operation center adapted to wirelessly connect the wireless internet control center and the wireless data processing module;
   a database server arranged to manage system information; and
   an applications server containing at least one utility operation application configured to operate the lighting system.

15. The system of claim 14, wherein the at least one application includes at least one of scheduling, zone grouping of power consuming devices, energy monitoring, load management, and maintenance.

16. The system of claim 15, wherein the scheduling application includes one of a lighting ramp-start process and a light sweeping process.

17. The system of claim 15, wherein the energy monitoring application monitors and controls the power consumption of the plurality of power consuming devices.

18. The system of claim 15, wherein the system information includes building information, zone control information, user names, and passwords.

19. The system of claim 1, further comprising a wireless WAN TCP/IP gateway arranged to facilitate communication between the data processing module and the internet control center.

* * * * *